United States Patent [19]
Kayan

[11] Patent Number: 5,175,423
[45] Date of Patent: Dec. 29, 1992

[54] ROTARY DATA CARD SCANNING APPARATUS

[75] Inventor: Helmut L. Kayan, Redwood City, Calif.

[73] Assignee: Verifone, Inc., Redwood City, Calif.

[21] Appl. No.: 697,944

[22] Filed: May 9, 1991

[51] Int. Cl.⁵ ............................................. G06K 13/00
[52] U.S. Cl. .................................. 235/477; 235/384; 235/475; 235/476
[58] Field of Search ............... 235/384, 487, 475, 476, 235/477; 364/412; 360/2

[56] References Cited

U.S. PATENT DOCUMENTS

| | | | |
|---|---|---|---|
| 3,609,300 | 9/1971 | Halpern | 235/384 |
| 3,654,624 | 4/1972 | Becker et al. | 346/138 |
| 3,983,578 | 9/1976 | Price | 360/2 |
| 4,288,688 | 9/1981 | Kiyama | 235/384 |
| 4,322,614 | 7/1982 | Sloan et al. | 235/475 |
| 4,613,747 | 9/1986 | McCarthy | 235/477 |
| 4,677,553 | 6/1987 | Roberts | 364/412 |
| 4,704,518 | 1/1988 | Brunn et al. | 235/475 |
| 4,788,419 | 11/1988 | Walters | 295/381 |
| 5,120,497 | 6/1992 | Petch et al. | 235/485 |

FOREIGN PATENT DOCUMENTS 0131812  1/1985  European Pat. Off.
2-28786  1/1990  Japan.

Primary Examiner—Harold Pitts
Attorney, Agent, or Firm—Lowell C. Bergstedt

[57] ABSTRACT

Apparatus for reading a data card which comprises a thin, flexible medium having leading and trailing edges and a data stripe formed thereon at a prearranged location and extending transverse to said leading and trailing edges. The apparatus comprises a card guide arrangement defining a cylindrical card guide path and an entrance slit for accepting said card into said guide path. A drive arrangement cooperatively associated with said card guide arrangement for driving said data card through said entrance slit and around said cylindrical card guide path. A transducer arrangement positioned at a prearranged location on said cylindrical card guide path for detecting data on said data stripe of a data card being driven around said cylindrical card guide path by said drive arrangement.

25 Claims, 10 Drawing Sheets

ROTARY DATA CARD SCANNING APPARATUS

FIELD OF THE INVENTION

This invention relates generally to data card scanning systems and more specifically to apparatus for scanning a thin data card medium through a rotary or cylindrical card guide path for reading and/or writing data onto a data stripe on the data card.

BACKGROUND AND PRIOR ART

Apparatus for automatic scanning of data cards is useful in many fields, for example, card readers in automated teller machines, and card reader/writers employed in vending machines or transportation access turnstiles to read prepaid cards. In the prior art, automated data card scanning apparatus has generally been of the linear scanning variety and a number of different design approaches have been used in the art.

Fully automated data card scanners use a card transport mechanism to pull the data card into the reader and then either drive the card over stationary read or read/write heads or utilize a separate transport mechanism to drive the read/write heads over the data stripes on the data card.

Pass U.S. Pat. No. 3,386,753, Pfost et al. U.S. Pat. No. 4,020,325, and Redemacher U.S. Pat. No. 4,879,607 each illustrates a typical prior art linear card reader/writer apparatus in which a card transport mechanism drives the data card into the reader and past a stationary transducer assembly for reading the data on the card and then reverses to drive the card back out of the reader. Many other prior art patents show this type of reader structure. While these designs adequately handle the task of reading and writing data on a data card, they are typically bulky systems which take up a significant volume of space in an overall machine in which they are used. In order for such systems to provide a card swallow feature, the data card must be driven completely to the back of the system and this requires substantial additional space in the machine.

Other data card read/write systems use a card transport mechanism to pull the card into the system and to scan the card past read and write transducers with single direction drive of the card to an exit slot remote from the card insert slot. These systems use a flexible data card medium and typically the card path involves turning the card through a 90 degree angle between the entrance slot and the exit slot. These types of data card read/write systems have been used extensively in rapid transit system turnstiles.

Another type of automatic data card read/write systems involves manual insertion of the card into the card read position, with a transducer system which is then scanned across the data stripe on the card. Killborn U.S. Pat. No. 4,527,052 and Okuno U.S. Pat. No. 4,581,523 are typical examples of this type of system. While the Killborn '052 patent discloses a card swallow feature, it uses a separate drive system to drive the card sideways into a card swallow bin and this separate drive mechanism increases the cost and volume requirement for mounting the card reader mechanism in a machine.

Applications for automated magnetic stripe card read/write systems have expanded dramatically in the past several years. Many manufacturers of vending machines, laundry machines, telephone systems and the like have an interest in using data card read/write systems in their machines, but find it difficult to adapt to the bulkiness and cost of the prior art apparatus which provides fully automated card handling with the card disappearing into the system during handling.

Card swallow features are especially desirable in some applications, such as soft drink vending machines in which prepaid cards of the promotional variety need to be swallowed in order to track the amount of use that they are receiving. In other applications it is desirable to swallow cards that have exhausted their value or that have been detected to be counterfeit or otherwise invalid for use in the machine. Including this feature in a read/write systems typically adds extra volume which cannot be tolerated, especially if the extra volume is taken up in either width or depth of the apparatus, which is the typical case in the prior art.

Accordingly it can readily be appreciated that there is a need in the art for a data card read/write systems which is capable of performing fully automated card transport through the read/write station and can incorporate a card swallow feature within a small additional volume of space.

OBJECTS OF THE INVENTION

Accordingly, it is the principal object of this invention to provide an improved data card read/write apparatus.

It is another object of this invention to provide a data card read/write apparatus which occupies a small volume of space.

It is another object of this invention to provide a data card read/write apparatus which includes a card swallow feature and still occupies a small volume of space.

It is another object of this invention to provide a data card read/write apparatus which is inexpensive to manufacture and easy to assemble.

It is another object of this invention to provide an improved data card reader/writer/marker apparatus.

FEATURES AND ADVANTAGES OF THE INVENTION

One aspect of this invention features apparatus for reading a data card which comprises a thin, flexible medium having leading and trailing edges and a data stripe formed thereon at a prearranged location and extending transverse to the leading and trailing edges. The apparatus comprises the combination of card guide means defining a cylindrical card guide path and an entrance slit for accepting the card into the guide path; drive means cooperatively associated with the card guide means for driving the data card through the entrance slit and around the cylindrical card guide path; and transducer means positioned at a prearranged location on the cylindrical card guide path for detecting data on the data stripe of a data card being driven around the cylindrical card guide path by the drive means.

This feature of the invention facilitates making the overall size and volume of the card reader small and thus to use the device in machines that larger devices would not fit into. The cylindrical card path provides card handling in a smaller space than the length of the card with a card path diameter that is basically the card length divided by the constant "pi".

This basic embodiment of this invention may add an optional marker means which is operatively associated with the card guide means for marking a prearranged indicia on the data card.

In one embodiment of the apparatus of this invention, the entrance slit defined by the card guide means is a card-in/out slit operative during a card capture time period to admit the data card into the cylindrical card guide path and operative during a card discharge time period to allow discharge the data card from the cylindrical card guide path. The card guide means includes a guide claw means having a guide finger portion located at the card-in/out slit and movable between a card in-out position and a card guide position and spring means for biasing the guide finger portion toward the card in-out position. The card in-out position permits free movement of the data card through the card-in/out slit during both the card capture time period and the card discharge time period entrance slit. The guide finger portion is moved into the card guide position by the leading edge of a data card being driven around the cylindrical card guide path to provide a smooth guided movement of the data card at the position of the card-in/out slit. In this embodiment, the drive means comprises a bidirectional drive means for driving the data card alternatively in a forward direction to drive the data card forwards through the entrance slit and around the cylindrical card guide path thereby to scan the data stripe thereon past the transducer means and in a reverse direction to drive the data card backwards through the entrance slit to discharge the card from the card guide means.

The advantage of this feature is that the card is smoothly guided by the guide claw means at the point of the card entrance slit so that drastic changes in speed and other parasitic forces are not experienced by the card to the degradation of the reading or writing accuracy of the device.

In another embodiment of this invention, the card-in/out slit is located at an upper portion of the cylindrical card guide path and the card guide means further defines a card swallow path including a card swallow slit located at a position on the cylindrical card guide path separated from the entrance slit. In this embodiment, the card guide means further includes a read capture claw means having a guide finger portion located at the card swallow slit and movable between a card capture position and a card swallow position, and a spring biasing means for biasing the guide finger portion of the read capture claw means toward the card swallow position. An actuator means is provided for selectively moving the guide finger portion of the read capture claw means to the card capture position thereby to capture the data card in the cylindrical card guide path and to smoothly guide the captured data card at the location of the card swallow slit.

From this it should be apparent that the apparatus of this invention has the advantage of readily combining a small volume card reader/writer with the ability to swallow the card without a substantial increase in the size of the apparatus.

In another embodiment of this invention having a card swallow feature, the card guides means has separate entrance and exit slits and a diverter is employed in the linear portion of the card path at the exit slit and is operated by an actuator so that the diverter alters the card path from an exit path to a capture path.

In a presently preferred form of this invention, the card guide means comprises a capture block means and a drum assembly means. The capture block means has a cylindrical internal cavity forming outer wall surfaces of the cylindrical card guide path and an entrance slit forming an opening to the cylindrical internal cavity, a forward portion of a top wall section of the capture block means serving as a bottom wall portion of a linear card guide for guiding a data card into the entrance slit. The drum assembly is received within the cylindrical internal cavity and has an outer cylindrical surface forming inner wall surfaces of the cylindrical card guide path.

The drive means of this embodiment comprises a pair of drum wheels, a drive shaft and pulley arrangement, a pair drive belts, and a motor driving means. The drum wheels are mounted for rotation on opposite ends of the drum assembly and extend outside the capture block means with a separation distance between the drum wheels corresponding generally to the width of the data card. The drive shaft with a pair of pulleys thereon is mounted forward of the capture block means with the pulleys being separated from each other by a distance greater than the width of the data card and having a diameter larger than the diameter of the drum wheels. A pair of drive belts extends over the pair of pulleys and over the drum wheels. The motor drives the drive shaft to turn the pulleys and thereby to drive the drive belts and the drum wheels.

This preferred embodiment further comprises an entrance card guide for guiding the data card toward the entrance slit and into driving engagement between the pair of drive belts and the drum wheels whereby the leading edge portion of the data card is pulled by the drive belts and drum wheels through the entrance slit and the data card is then driven completely into the cylindrical card guide path. The transducer means is mounted to the drum assembly at the prearranged location relative to the cylindrical card guide path.

In this embodiment, the card guide means and the drive means are preferrably carried on a support means which comprises a mounting block and a pair of side brackets. The mounting block has a frontplate carried on a front surface thereof and further has a card inlet/outlet slit formed therein communicating with a top wall surface of the mounting block serving as a bottom wall portion of the entrance card guide. The pair of side bracket means are mounted one on each side of the mounting block. Each of the side bracket means has a mounting bracket arm extending backward from the mounting block and is adapted for mounting the card guide means therebetween such that the top wall portion of the mounting block is aligned with the forward portion of a top wall section of the capture block means to form a complete bottom wall portion of a linear card guide from the inlet/outlet slot to the entrance slit in the capture block means. Each of the side bracket means has a vertical wall section extending above the mounting block and the capture block means to form side wall portions of a linear card guide leading to the entrance slit on the card guide means.

The drive shaft and pulley assembly are carried on the mounting block behind the frontplate with the pair of pulleys being spaced from each other by a distance greater than the separation between the drum wheels on the drum assembly and having a diameter greater than the diameter of the drum wheels thereby to allow the entrance card guide to be located between the pair of pulleys. The motor assembly is mounted on an outer side surface of one of the side bracket means and is coupled in driving relation to the drive shaft and pulley assembly. A pair of upper and lower drive belt guide wheels are mounted on the side bracket means immediately forward of the position of the entrance slit on the card guide means for directing each of the drive belts onto a respective one of the drum wheels carried on the drum assembly whereby a data card inserted through the inlet/outlet slot is accurately guided along the linear card guide path toward the entrance slit until respective edge portions of the data card are engaged between the drive belts and the drum wheels and thereafter driven through through the entrance slit into the cylindrical card guide path.

This arrangement provides the advantage of an accurate guidance of a data card into the cylindrical card guide path and accurate driving of the data card throughout the cylindrical card guide path by the drive belts and drum wheel combination.

In one version of this preferred embodiment, the entrance slit in the capture block means is a card-in/out slit operative during a card capture time period to admit the data card into the cylindrical card guide path and operative during a card discharge time period to allow discharge the data card from the cylindrical card guide path. The card guide means includes a guide claw means mounted in the capture block means and having a guide finger portion located at the card-in/out slit. The guide claw means is movable between a card in-out position and a card guide position and a spring means biases the guide finger portion toward the card in-out position. The card in-out position places the guide finger portion adjacent the inner wall surfaces of the cylindrical card guide path to permit free movement of the data card through the card-in/out slit during both the card capture time period and the card discharge time period entrance slit. The guide finger portion is moved into the card guide position separated from the inner wall surfaces of the cylindrical card guide path by the leading edge of a data card being driven around the cylindrical card guide path and thereby provides a smooth guided movement of the data card at the position of the card-in/out slit.

For this version, the drive motor is a bidirectional drive motor means for driving the pair of pulleys, and correspondingly the drive belts and drum wheels of the drive means alternatively in a forward direction to drive the data card forwards through the entrance slit and around the cyclindrical card guide path thereby to scan the data stripe thereon past the transducer means and in a reverse direction to drive the data card backwards through the entrance slit to discharge the card from the card guide means.

In this version of a preferred embodiment of this invention, the capture block means comprises a front capture block and a back capture block. The front capture block has a backward facing semi-cylindrical concave surface forming one half of the cylindrical internal cavity of the capture block means. The back capture block has a frontward facing semi-cylindrical concave surface forming the other half of the cylindrical internal cavity of the capture block means. The front capture block has the drum assembly mounted thereto, and the back capture block is mounted over the drum assembly and forms with the front capture block the card-in/out slit at an upper portion of the cylindrical card guide path. The front capture block and the back capture block further form a card swallow slit located at a lower portion of the cylindrical card guide path.

The guide claw means is mounted to the back capture block and the capture block means further comprises the combination of a read capture claw means, a spring biasing means, and an actuator means. The read capture claw means is mounted to the back capture block and has a guide finger portion located at the card swallow slit and movable between a card capture position and a card swallow position. The spring biasing means biases the guide finger portion of the read capture claw means toward the card swallow position. The actuator means is mounted on the mounting block for selectably moving the guide finger portion of the read capture claw means to the card capture position.

The card capture position is characterized by the guide finger portion being spaced away from the inner wall surfaces of the cylindrical internal cavity to capture the data card in the cylindrical card guide path and provide a smooth continuous guidance of the data card around the cylindrical card guide path in the vicinity of the card swallow slit, and the card swallow position is characterized by the guide finger portion being positioned adjacent the inner wall surfaces of the cylindrical internal cavity to allow the data card to pass into the card swallow slit.

These features provide the advantage of a card reader apparatus which is easy to fabricate and assemble.

In this preferred embodiment, the front capture block is mounted in a pair of recesses on the side bracket means dimensioned to receive and accurately position the front capture block in relation to the mounting block. The drum assembly is mounted to the front capture block in an accurately registered orientation by means of a pair of cooperative location pin and aperture arrangements. The back capture block includes a mounting bracket for mounting the back capture block in an accurately registered position over the drum assembly using cooperative fastening means associated with the mounting bracket and the side bracket means.

These features add to the ease of assembly of this embodiment of a data card reader apparatus.

In one version of this preferred embodiment this invention, a punch and die means is cooperatively mounted in the mounting block, the back capture block and the drum assembly. The punch and die assembly includes a solenoid operated plunger core means mounted within the mounting block and carrying the punch means. A punch guide bushing is mounted in a hub on a back portion of the solenoid and is received in a registration aperture formed in the forward facing surface of the front capture block and a compression punch return spring is carried in the punch guide bushing to bias the plunger core and punch to a retracted position. The die assembly is mounted in the drum assembly in an accurately registered position in the plane of the cooperative location pin and aperture arrangements which position the drum assembly relative to the front capture block to provide automatic alignment of a die aperture in the die assembly with the punch element.

This punch and die arrangement provides the advantage of reliable punching of a hole through a data card at a desired location along the lenth of the data card being scanned through the cylindrical card guide path.

In this version with a punch and die arrangement, the shaft on which the pair of pulleys is mounted extends through the the solenoid operated plunger of the punch means. The solenoid operated plunger comprises a bobbin having an aperture therethrough receiving the drive shaft with separate first and second winding supporting bobbin sections extending forward and rearward from the aperture and carrying first and second solenoid winding sections thereon. The plunger core means has a slot therein for receiving the drive shaft and accomodating driving movement of the plunger core relative to the drive shaft.

This structure reduces the size of the reader apparatus and thus the overall space taken up by the device in an overall system in which it is being employed.

One form of this version of the invention is adapted for reading a data card with a magnetic stripe thereon and the transducer means is a magnetic read head mounted on the drum assembly at a prearranged position to detect data on the magnetic strip as the data card is driven around the cylindrical card guide path. The punch and die means is mounted in a position aligned with the transducer means and is operable to punch a hole in the magnetic strip which can be sensed by the magnetic read head.

The advantage provided by these features is that the position of the hole in the stripe can be read by the read head. In combination with other features this can be used to detect if there is correspondence between the hole position, when used as a value marker, and the value data written on a magnetic stripe on the card.

In a preferred embodiment of this invention, the drum assembly comprises a pair of complementary drum sections and a pair of drum flange elements. The pair of complementary drum sections are adapted to snap together to form a cylindrical drum. Each of the drum sections has a hollow core extending through a central portion thereof and a central hub section on a free end thereof with a split outer mounting hub section having a retaining lip thereon. The pair of drum flange elements has a hollow central core and each of the drum flange elements is mounted over one of the split mounting hub sections and is retained thereon by the retaining lip. Each of the drum wheels comprises a cylindrical drum belt carrier journalled for rotation on one of the drum flange elements and carrying a resilient tire member on an outer cylindrical surface thereof.

This form of drum assembly contributes to an inexpensive apparatus which is easy to fabricate and assemble.

A version of such a preferred embodiment having this drum assembly may be adapted for reading a data card having a pair of magnetic strips thereon with each magnetic strip having at least one track of data thereon. In such an adaptation, the transducer means comprise a pair of magnetic pick up units each with at least one magnetic read head thereon. Each of the complementary drum sections defines a mounting channel for receiving one of the magnetic pick up units in a radially slidable relationship with the magnetic read head thereon facing the cylindrical card guide path. A leaf spring element is employed and has two complementary leaf spring sections thereon extending in opposite directions from a central mounting section. Each of the complementary drum sections defines one half of a spring retainer channel adapted to receive a portion of the central mounting section of the leaf spring for capturing the central mounting section in the retainer channel when the complementary drum sections are snapped together. The complementary leaf spring sections each contact a bottom portion of an associated one of the magnetic pick up units for biasing the magnetic pick up unit toward an outer wall surface of the cylindrical internal cavity and thereby ensuring good magnetic signal pick up contact between the magnetic read head and the magnetic strip on a data card driven through the cylindrical card guide path.

This feature gives reliable positioning of the magnetic pickup units relative to the data stripes on the data card and accurate pressure between the read or read/write heads and the data card for accurate and reliable pick up of the magnetic signal pattern on the magnetic stripe of the data card.

DETAILED DESCRIPTION OF PREFERRED EMBODIMENTS

Referring to FIGS. 1-4, a data card reader apparatus in accordance with this invention is adapted for reading a data card 50 in the form of a thin, flexible medium. The term "data card reader" will be used throughout as a general convenient description of the apparatus of the invention, but it should be understood that the invention may involve in some embodiments a data card read/write system, a data card read/write/swallow system, or a data card read/write/swallow/marker system. Other combinations of features such as read/swallow or read/write/mark are also possible. The read function is typically common to all of the embodiments since that is the most basic single function and even a system dedicated for writing data on a card for purposes of manufacturing cards will includes a read after write operation.

Figure 16:
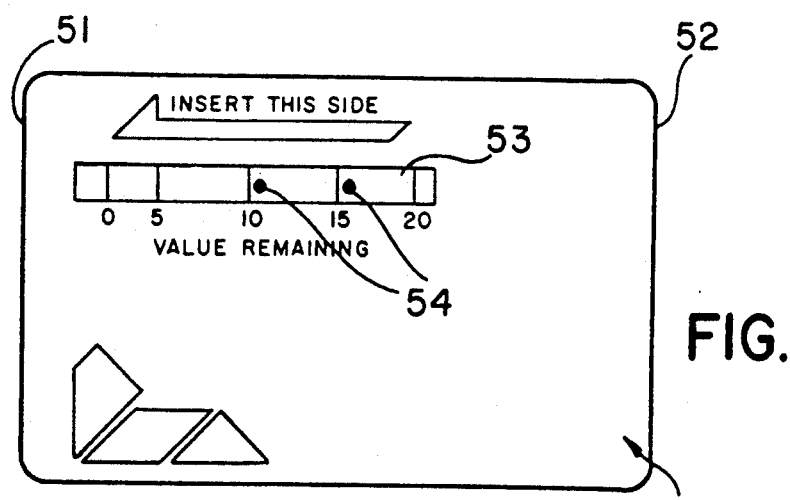
FIGS. 16 and 17 are pictorial views showing one example of a magnetic data card which can be used in one embodiment of a data card read/write apparatus in accordance with this invention.
Figure 17:
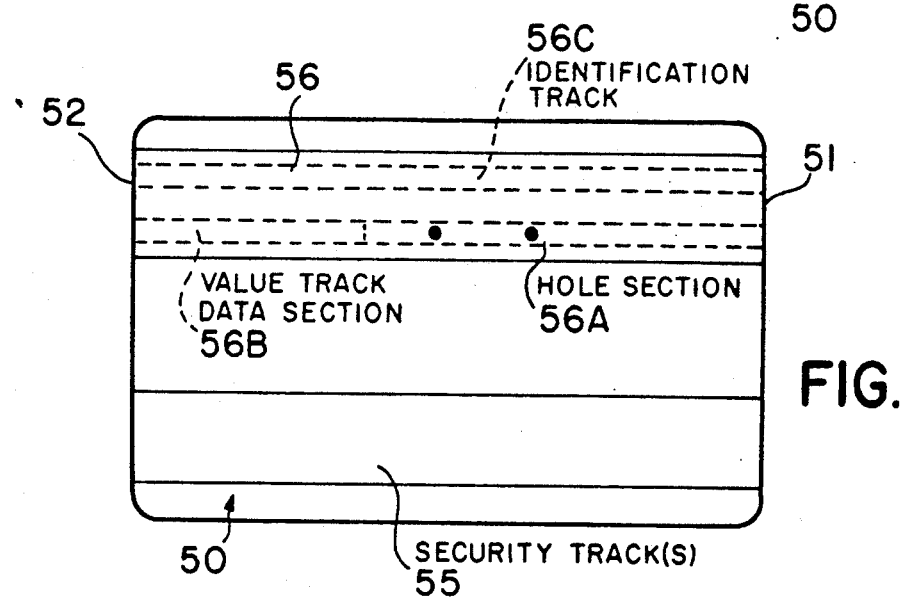

FIGS. 16 and 17 illustrate one embodiment of a magnetic stripe data card which can be used in one embodiment of a data card read/write apparatus in accordance with this invention. The specific features of this data card will be described in detail below. It should be understood that this invention is not limited to apparatus for reading data on magnetic stripe cards but can also be used for optical reading of bar code data and other forms of optically encoded data on a data card or for magnetic reading of other forms of magnetically encoded data on a data card. The form of the data encoding simply determines the type of reading transducer to be employed in the system. In the case of magnetic stripe data card applications, the transducers may comprise read only magnetic head elements or read/write elements for alternatively reading or writing of data on a particular data track on a magnetic stripe carried on the card.

By use of the term "thin, flexible medium" what is generally meant is that the card has a combination of card stock material and thickness such that the card can readily be driven through a cylindrical card guide path which is only slightly longer than the length of the card without permanently bending the card stock or otherwise deforming the card in the scanning process. Thus, for example, data card 50 may be formed from paper or flexible plastic media.

The basic elements of a data card reader in accordance with this invention are a card guide means 20, a drive means 30 and a transducer means 60. Card guide means 20 defines a cylindrical card guide path 29 and an entrance slit 29A best seen in FIGS. 5–7. Drive means 30 cooperates with card guide means 20 for driving data card 50 through entrance slit 29A and around cylindrical card guide path 29. Transducer means 60 are positioned at a prearranged location on the cylindrical card guide path so that they will detect data on a data stripe of a data card as it is driven around the cylindrical card guide path. Drive means 30 may repetitively drive a data card around the cylindrical card guide path of the card guide means for separate reading and/or writing cycles on various data tracks on a data card. A detailed example of a particular sequence of operation will be given below.

Figure 5:
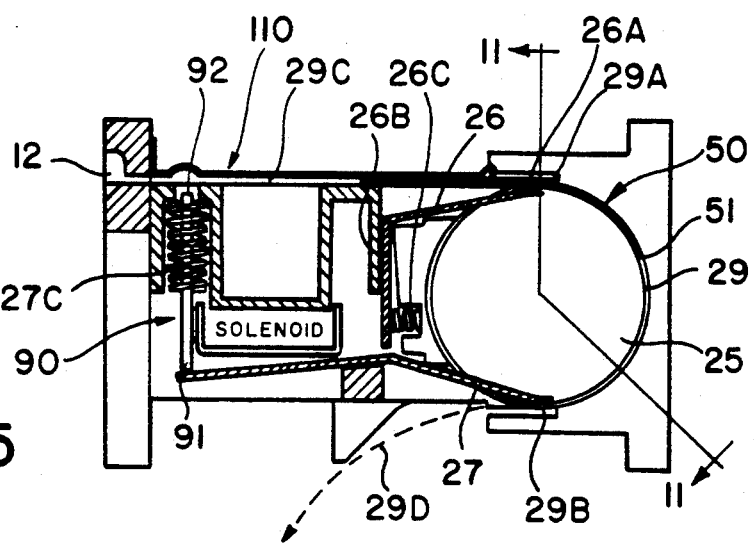
FIGS. 5, 6, and are partial section views illustrating the operation of certain features of a data card read/write apparatus in accordance with this invention.
Figure 6:
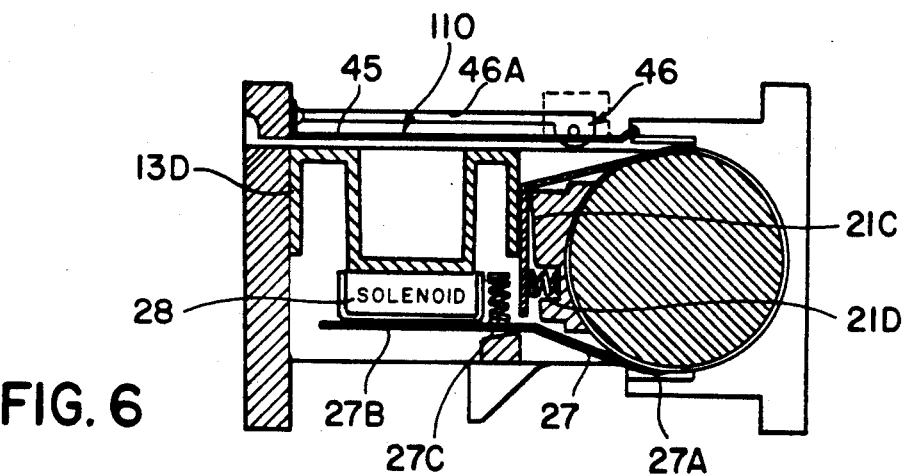
Figure 7:
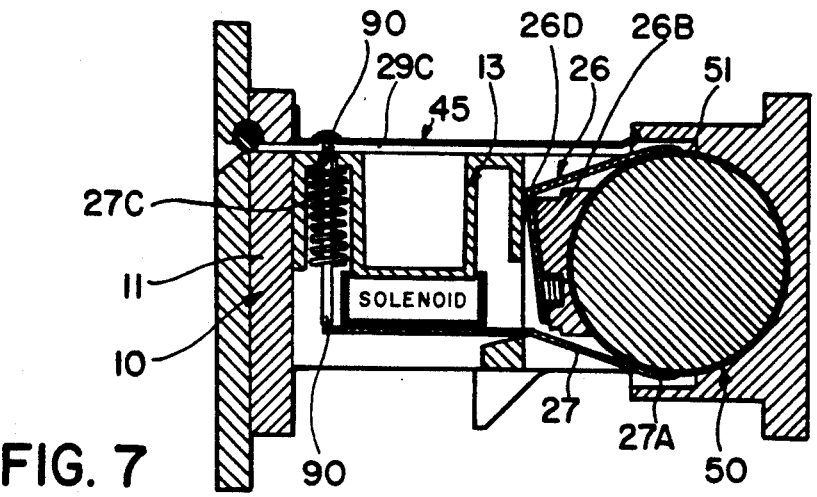

In the embodiment shown in FIGS. 1–7, data card 50 is inserted and discharged through one in-out slot and entrance slit 29A is a card-in/out slit which is operative during a card capture time period to admit data card 50 into a cylindrical card guide path 29 and is later operative during a card discharge time period to allow discharge data card 50 from cylindrical card guide path 29. In this embodiment card guide means 20 also includes a guide claw means 26 having a guide finger portion 26A located at card-in/out slit 29A and movable between a card in-out position shown in FIGS. 5 and 6 and a card guide position shown in FIG. 7. A spring means 29B biases guide finger portion 26A toward the card in-out position and thereby permits free movement of a data card through card-in/out slit 29A during both a card capture time period and a card discharge time period. As shown in FIG. 7, guide finger portion 26A is moved into a card guide position by leading edge 51 of data card 50 as it is driven around cylindrical card guide path 29. The curved guide finger portion 26A provides a smooth guided movement of data card 50 at the card-in/out slit position.

Data card 50 is shorter than the length of cylindrical card guide path 29 so that, on each cycle of travel of data card through the cylindrical card guide path 29, guide claw means 26 will move between the card-in/out position and the card guide position.

In this embodiment drive means 30 is a bidirectional drive which is capable of driving alternatively in a forward direction to drive data card 50 forwards through card-in/out slit 29A and around cylindrical card guide path 29 and thereby to scan a data stripe on data card 50 past transducer means 60 and in a reverse direction to drive data card 50 backwards through a card-in/out slit 25A to discharge the data card. During this card discharge period, guide claw means is moved into the card-in/out position shown in FIG. 5 as the trailing edge 52 of data card goes past the guide finger portion 26A on the reverse drive cycle. This happens before leading edge 51 of data card 50 reaches the other side of the guide finger portion 26A and thus the leading edge 51 will pass through the card-in/out slit 29A and a discharge path for data card 50 is established.

For handling a standard size magnetic card having a length of 3.375 inches, the circumference of the cylindrical card guide path 29 is preferably about 3.93 inches, leaving a modest gap between the leading and trailing edges of the data card 50 as it is driven through the cylindrical card guide path 29. The card speed is not critical and the range of speeds that can be handled depends on a number of factors, including the type of data stripe, the transducer mechanism and the speed at which data from the data stripe can be processed by the electronic control and data acquisition system. For reading magnetic stripes using the components of this invention, the card speed is preferably in the range of eight to twelve inches per second. The mechanisms of this invention are not limited to this card speed range and can readily handle card speeds in the range of about five to twenty ips.

It should be understood that the transducer means 60 could be positioned in different locations from the one shown in the drawings. There are a number of locations on the drum assembly 25 that the transducers could be located. Furthermore, the transducer means 60 could also be mounted in the back capture block 22 with the data card 50 being inserted in a different orientation. The placement of the transducer means 60 on the drum assembly 25 is preferable for lower wear and other considerations.

THE CARD SWALLOW FEATURE

In a preferred embodiment of this invention, a card swallow feature is provided. In this embodiment, the card-in/out slit is located at an upper portion of the cylindrical card guide path 29 as shown and card guide means 20 further defines a card swallow path 29D including a card swallow slit 29B located at a position on cylindrical card guide path 29 which is separated from entrance slit 29A, in this case directly opposite entrance slit 29A. In this embodiment, card guide means 20 further includes a read capture claw means 27 having a guide finger portion 27A located at card swallow slit 29B and movable between a card capture position shown in FIGS. 6 and 7 and a card swallow position as shown in FIG. 5. A spring biasing means in the form of compression spring 27C biases guide finger portion 27A of read capture claw means 27 toward its card swallow position. An actuator means in the form of a solenoid 28 in this embodiment operates when actuated to attract operating tab 27B into contact with it to move guide finger portion 27A to its card capture position. When in its card capture position as shown in FIG. 6, data card 50 is captured in cylindrical card guide path 29 is guided for smooth card driving operation.

As shown in FIG. 5, a compression spring 27C may be associated with a card lockout assembly 90 in accordance with this invention. Card lockout assembly 90 includes a pin 91 which is biased against operating tab 27B by compression spring 27C which serves to bias operating tab 27B away from solenoid 28 and accordingly to bias pin 91 into the position shown in FIG. 5. In this position, pin 91 is withdrawn from aperture 92 and allows a card to enter entrance card guide path 29C. When read capture claw means 27 is moved by operation of solenoid actuator 28 into its card capture position shown in FIG. 6, pin 91 is driven up through aperture 92 to block insertion of a second card while one card is being processed through the reader.

SEQUENCE OF OPERATION

The sequence of operation of the embodiment of this invention shown in FIGS. 1-7 will be described in more detail below, but it will be helpful to consider the operating sequence briefly at this point. When a data card 50 is inserted into card insert slot 12 far enough to actuate card-in sensor 46, solenoid 28 is operated to position read capture claw means 27 into a card capture position as shown in FIG. 7, and drive means 30 is turned on in a forward direction to pull data card 50 through card-in/out slit 29A into cylindrical card guide path 29. After the trailing edge 52 of data card 50 passes the blocking pin aperture 92, pin 91 is driven into the entrance card path 29C to block entry of a second card. Solenoid actuator 28 is maintained in an operated condition the whole time that data card 50 is being driven around cylindrical card guide path 29 in a forward direction so that, in some cases, the data card 50 may make several passes around cylindrical card guide path 29.

When all of the read/write operations on data card 50 have been completed, data card 50 is either to be returned to the cardholder through card-in/out slit 29A and card insert slot 12 or is to be captured. If data card 50 is to be captured, solenoid actuator 28 is turned off and drive means 30 is operated in a forward direction. As the trailing edge 52 of data card 50 passes the guide finger portion 27A of read capture claw means 27, spring 27C will return the guide finger portion to the card capture position shown in FIG. 5. On the next pass through the cylindrical card guide path 29, data card 50 will be driven through card swallow slit 29B along the card swallow path 29D. If data card 50 is to be returned, drive means 30 is operated in a reverse drive direction and data card 50 is driven back through card-in/out slit 29A and card insert slot 12.

It should be noted at this point that the card swallow feature of this invention is optional and thus the incorporation of a read capture claw means is also optional. In an embodiment of this invention which does not include a card swallow feature, exit slit 29B and read capture claw means 27 would both be eliminated. The data card 50 would always be captured within cylindrical card guide path 29 and, after card read/write operations are completed, would be returned back through card-in/out slit 29A and card insert slot 12. In this embodiment, card reader assembly 5 could be mounted in any orientation, i.e. with the card insert slot 12 on the top or on the bottom.

It should also be understood that the rotary card reader of this invention is not limited to an embodiment in which the data card 50 is returned though the same path as it is inserted. Consider the embodiment shown in FIG. 18 in which data card 50 is returned through a card exit path 29E to a card-out slot 12A. In this embodiment, read capture claw means 27 is placed in its card capture position similar to the position shown in FIG. 6 to capture data card 50 into cylindrical card guide path 29 and is placed into a card exit position, shown in FIG. 18 to allow the card to exit through exit slit 29F.

Figure 10:
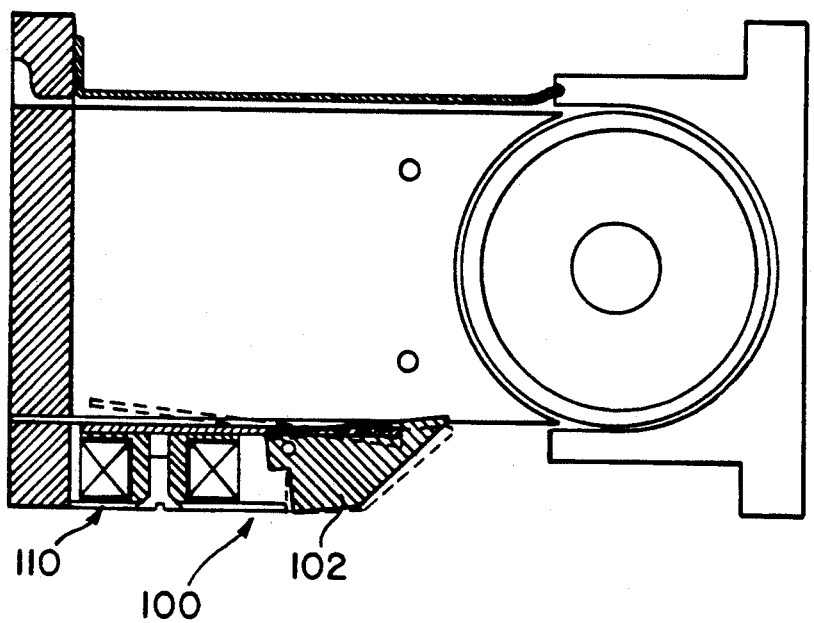
FIG. 10 is a partly sectioned elevation view of an alternative embodiment of a card swallow feature in a data card read/write apparatus in accordance with this invention.

This embodiment of the invention could also incorporate a card swallow feature as shown in FIG. 10. A separate card diverter mechanism 100, including a diverter actuator solenoid 101 and a diverter gate 102 would be required to selectively establish the card exit path as an outlet path to outlet slit 12A or a swallow path to a card collecting bin (not shown).

Figure 18:
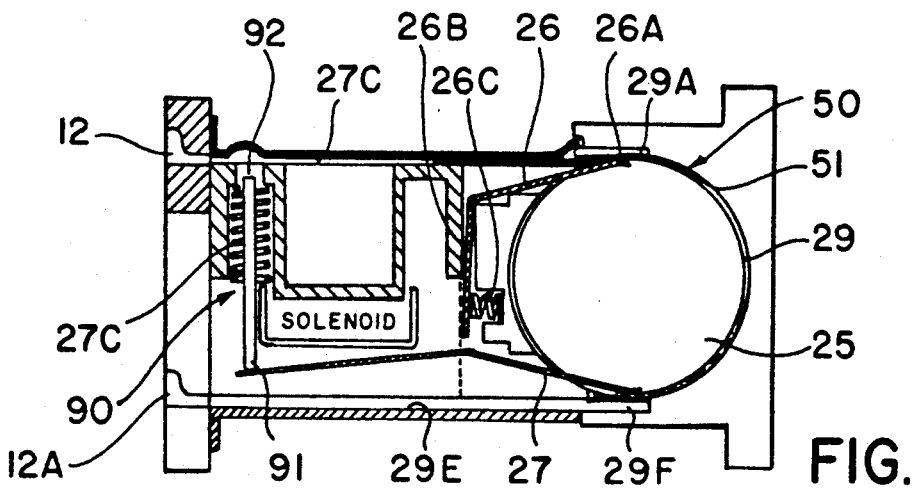
FIG. 18 is a partially sectioned elevation view of an alternative embodiment of a card read/write apparatus in accordance with this invention.

Note that in both of the embodiments of FIGS. 10 and 18, a bidirectional drive is not required since data card 50 is driven out of cylindrical card guide path 29 in the same direction as it is brought into cylindrical card guide path 29. Bidirectional drive in such an embodiment might still be desired for purposes of removing a card jammed into the entrance slit by reversing the direction of drive.

This arrangement of the read capture claw means 27 allows it to be used as the drive for the locking pin arrangement 90. However, it should be understood that an alternative arrangement of the read capture claw means 27 could be provided in which it is normally biased toward the card capture position by a spring biasing means and the actuator could be arranged to move the read capture claw means 27 to the card swallow position. This would merely involve some obvious design changes in the reader 5 such as by reversing the location of the actuator.

It should be further understood that the lockout pin arrangement 90 could also be driven from by the motor drive system using a clutch mechanism to drive the pin upwards at the appropriate time when the motor turns on. Finally it should be noted that the spring biasing means 37C can be eliminated if it can be insured that the actuating tab 27B does not retain any magnetism and will drop away from the actuator solenoid under the action of gravity, assuming the reader 5 is mounted in a horizontal orientation as shown.

The card-in sensor 46 is preferably a hall effect sensor and magnet arrangement with the magnet mounted on a cantilevered arm 46A such and the sensor on a circuit board. It should be understood that the mounting arm 46 could be spring biased so that the reader 5 could be mounted in any orientation, either horizontal as shown or vertical.

Referring to FIG. 10, it should also be understood that another embodiment of this invention using a single card-in/out slit 29A and card insert slot 12 may take the form in which the card insert slot 12 is at the bottom of the reader 5 where the exit slot 12A is shown in FIG. 10 and the card-in/out slit 29A is at the bottom of the cylindrical card guide path 29 and the diverter mechanism shown in FIG. 10 is employed on the card out cycle of the reader to determine whether the card is returned to the cardholder or swallowed by the reader.

From the above description of several alternative embodiments of this invention, it should be apparent that there are a number of ways that the various features of the invention may be implemented in practice. Several possible configurations have been described in some detail, but other variations are also possible.

DETAILS OF CARD GUIDE MEANS 20 AND DRIVE MEANS 30

As shown in FIGS. 4-7, a preferred embodiment of card guide means 20 comprises a capture block means 21, 22 and a drum assembly 25. Capture block means 21, 22 provides a cylindrical internal cavity forming outer wall surfaces of cylindrical card guide path 29 and entrance slit 29A. A forward portion 21A of a top wall section of capture block means serves as a bottom wall portion of a linear card guide for guiding data card 50 into entrance slit 29A. Drum assembly 25 is received within the cylindrical internal cavity of the capture block means and has an outer cylindrical surface forming inner wall surfaces of cylindrical card guide path 29.

Figure 11:
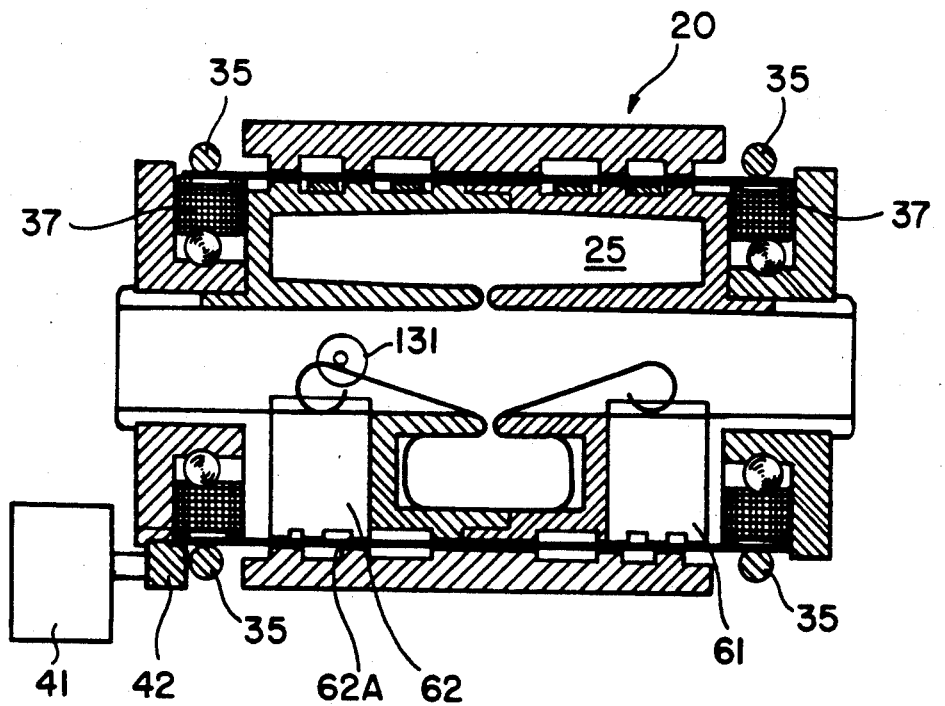
FIG. 11 is a section view of a drum assembly structure and drum wheel arrangement employed in one embodiment of a data card read/write apparatus in accordance with this invention.

In this preferred embodiment, drive means 30 includes a pair of drum wheels 37 (best seen in FIG. 11 which are carried on and on opposite ends of drum assembly 25 and journalled on bearing for rotation. Drum wheels 37 extend outside the back portion of capture block means with a separation distance between drum wheels 37 corresponding generally to the width of data card 50. A drive shaft and pulley arrangement 33,34 including a pair of pulleys thereon is mounted to mounting block assembly 10 forward of capture block means 20. The two pulleys are separated from each other by a distance greater than the width of data card 50 and having a diameter slightly larger than the diameter of drum wheels 25. The reason for this will be discussed later. A pair of drive belts 35 extend over the pulleys on the drive shaft and over drum wheels 37. A motor drives the drive shaft to turn the pulleys and thereby to drive the drive belts 35 which, in turn, drive the drum wheels 37.

Figure 1:
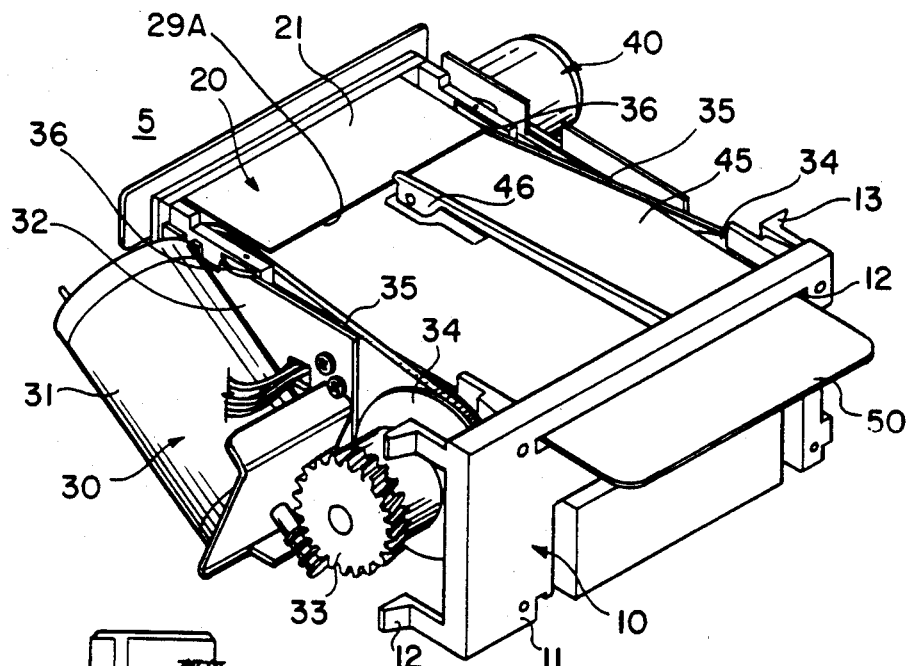
FIG. 1 is an isometric view of a data card read/write apparatus in accordance with this invention.
Figure 2:
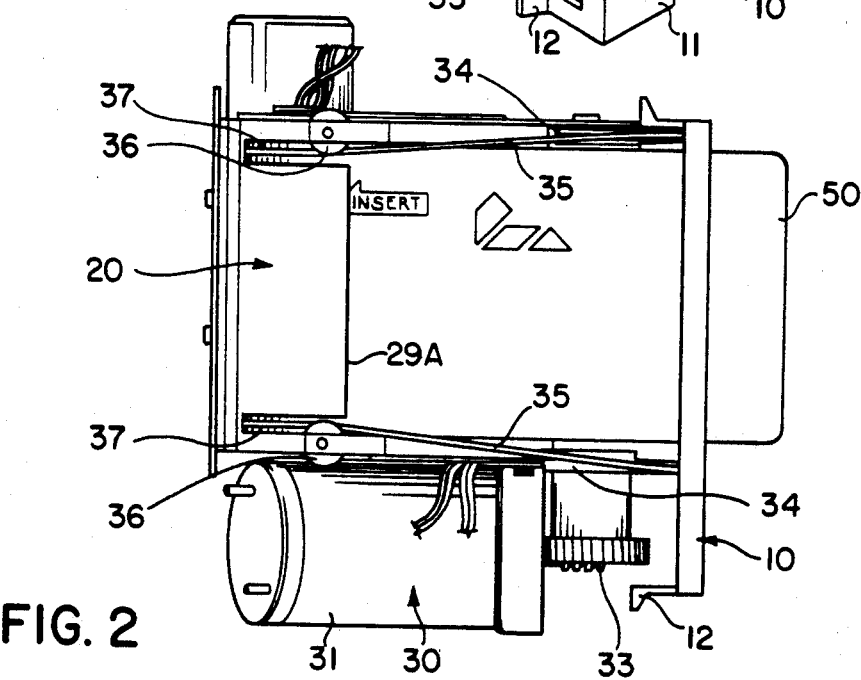
FIG. 2 is a top plan view of a data card read/write apparatus in accordance with this invention.
Figure 3:
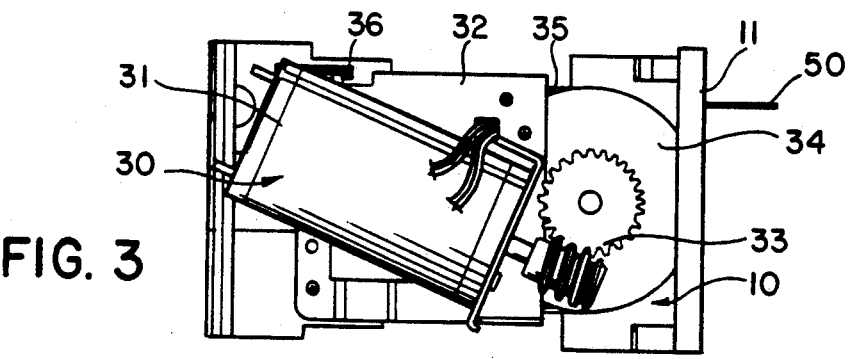
FIG. 3 is a side elevation view of a data card read/write apparatus in accordance with this invention.

An entrance card guide 110 guides data card 50 from card insert slot 12 toward card-in/out slit 29A and, as shown best in FIGS. 2 and 11, into driving engagement between drive belts 35 and drum wheels 37. The leading edge 51 of data card 50 is pulled by the drive belts and the drum wheels through the entrance slit and then driven completely into cylindrical card guide path 29. Transducers 60 are mounted to drum assembly at prearranged locations relative to cylindrical card guide path 29.

In this embodiment two magnetic transducer heads are used for reading and reading and writing on the tracks of the data card 50 shown in FIGS. 16 and 17. It should be understood, however, that this invention is not limited to reading magnetically encoded data on a data card, but that any form of data pickup transducer useful for reading a particular data stripe on a data card 50 may be employed in the reader 5. For example, the data stripe on the data card 50 may instead be a bar code and the transducer means 60 may comprise one or more optical transducers for detecting the bar code data pattern on the data card 50. Other transducer means 60 for reading hole patterns optically, or for optically or magnetically reading a MICR data pattern on a data card 50 may be employed.

Figure 4:
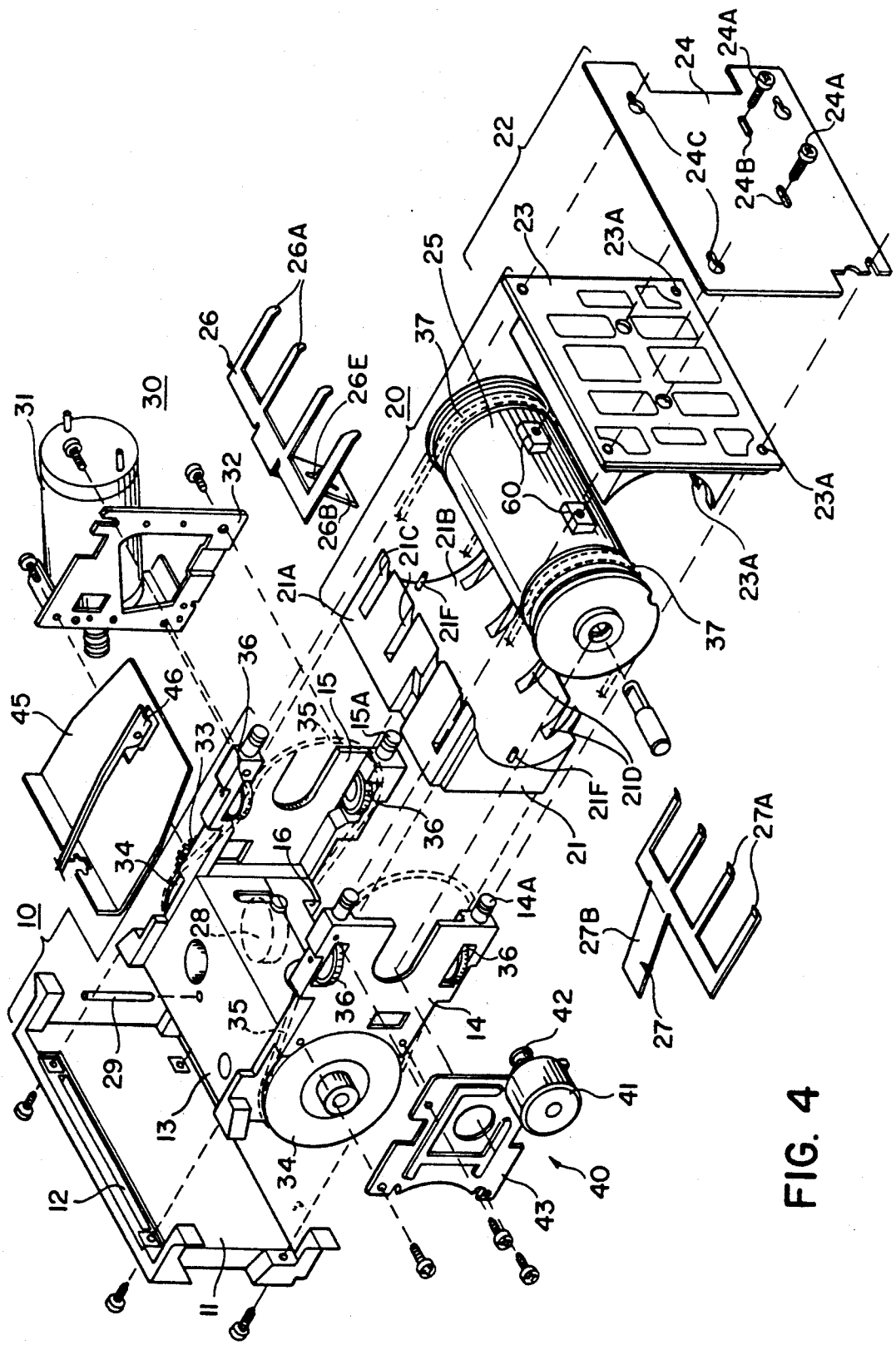
FIG. 4 is an exploded isometric view of a data card read/write apparatus in accordance with this invention.

Referring now to FIG. 4, it is seen that card guide means 20 and drive means are carried on a support arrangement 10. Support arrangement 10 includes a mounting block 13 having a frontplate 11 carried on a front surface thereof and having a card inlet/outlet slit 12 formed therein and communicating with a top wall surface of mounting block which serves as a bottom wall portion of entrance card guide 110 (FIG. 5). A pair of side brackets 14, 15 are mounted one on each side of mounting block 13. Each of side brackets 14, 15 have a mounting bracket arm extending backward from mounting block 13 and has a inside channel adapted for mounting card guide means 20 therebetween such that top wall portion of mounting block 13 is aligned with a forward portion of a top wall section 21A of capture block means 20 to form a complete bottom wall portion of a linear card guide from inlet/outlet slot 12 to entrance slit 29A. Each of side bracket means 14,15 also has a vertical wall section extending above mounting block 13 to form side wall portions of linear card guide 110.

Drive shaft and pulley assembly 33,34 is carried on mounting block behind frontplate 11. Pulleys 34 are positioned outside the side brackets to be spaced from each other by a distance greater than the separation between drum wheels 37. In addition pulleys 34 having a diameter greater than the diameter of drum wheels 37.

Motor assembly 31 is mounted on an outer side surface of side bracket 15 using a motor bracket 32 and is coupled in driving relation to drive shaft and pulley assembly 33,34. A worm gear drive arrangement is shown, but it should be understood that other drive arrangement could also be used.

A pair of upper and lower drive belt guide wheels 36 are mounted on side brackets 14,15 immediately forward of the position of entrance slit 29A on card guide means 20 for directing drive belts 35 onto drum wheels 37. Accordingly, as shown in FIG. 2, a data card 50 inserted through inlet/outlet slot 12 is accurately guided along linear card guide path 110 toward entrance slit 29A until respective edge portions of the leading edge 51 of data card 50 are captured between drive belts 35 and drum wheels 37. Card insert sensor 46 signals the card input and a control circuit arrangement, discussed below, turns on motor 31 in a forward direction to drive data card 50 through entrance slit 29A into cylindrical card guide path 29.

DETAILS OF CAPTURE BLOCK ASSEMBLY 20

The structural and operational details of capture block assembly 20 will now be described with reference to FIGS. 4-7 and 11. 10. Capture block assembly 20 comprises a front capture block 21, a back capture block 22 and a drum assembly 25. front capture block 21 has a backward facing semi-cylindrical concave surface 21B forming one portion of a cylindrical internal cavity of the assembled capture block arrangement. back capture block 22 has a frontward facing semi-cylindrical concave surface 23A which forms the other portion a cylindrical internal cavity.

Front capture block 21 has drum assembly 25 mounted thereto, and back capture block 23 is mounted over drum assembly 25. Together front capture block 21 and back capture block 22 form card-in/out slit 29A and card swallow slit 29B as well as the outer wall surface of cylindrical card guide path 29.

Guide claw means 26 is mounted to back capture block 21 by inserting the guide finger portion 26A through channels 21C. Operating tab 26B has a corner portion 26C which abuts a corner between channels 21C and back wall 21C which tapers inwardly to allow for rotation of operating tab 26B as guide finger portion 26A moves between a card-in/out position as shown in FIGS. 5 and 6 and a card guide position shown in FIG. 7. A mounting tab 26E carries one end of compression spring 26C thereon and the other end is received into a recess 21D in back wall 21C of front capture block 21.

Read capture claw 27 is mounted to back capture block 22 by inserting guide finger portion 27A through channels 21D until the guide finger portions are located at card swallow slit 29B. Compression spring 27C is mounted on operating tab 27B which extends into the mounting block 13 through an aperture 16. Read capture claw means 27 is first inserted into front capture block 21 and then as front capture block 21 is fit into the side brackets 14, 15, the operating tab 27B enters aperture 16.

Solenoid actuator 28 is mounted within a cavity in mounting block 13 and when operated moves guide finger portion 27A to the card capture position shown in FIGS. 6 and 7. In this position, the guide finger portions 27A complete the cylindrical card guide path 29 at the card swallow slit 29B for smooth guidance of a data card 50 and thus more accurate and smooth driving of the card at a constant velocity, i.e. with less wow and flutter in the card as it moves through the cylindrical card guide path 29.

As shown in FIG. 4, front capture block 21 is received in specially formed recesses in side brackets 14, 15. The dimensions and shape of these components is designed and maintained during manufacturing such that the parts will assemble together into a tight fitting relationship without requiring mounting screws. After front capture block 21 is inserted between the two side bracket arms 14, 15, drum assembly 25 is assembled to front capture block 21 by inserting two apertures (not shown) in the flange elements on drum wheels 37 into the two mounting posts 21F. The two apertures are positioned precisely to locate drum assembly 26 in the correct orientation on front capture block 21 such that the transducers 60 will be in the correct position and the punch and die means to be described later will have the die element accurately self-aligned with the punch element.

With the drum assembly 25 assembled to the front capture block 21, the drive belts 35 can be assembles over the pulleys 34 and the drum wheels 37. This is done prior to mounting the back capture block 22 onto the drum assembly 25. The tachometer bracket and tachometer are now mounted on the side arm bracket 14 with the drive wheel 42 of the tachometer 41 positioned adjacent the drive belt as shown in FIG. 11. This position of the tachometer drive wheel is aligned with the center line of the two transducer means 60 mounted on the drum assembly 25 so that the tachometer will begin to register position changes of the data card 50 at about the same time that the transducer means 60 will begin to pick up data on a data track. This position of the position sensing means is a convenient one, but it should be understood that the tachometer could be placed at other locations along the cylindrical card guide path 29. FIG. 4 does not show the actual position relationship between the tachometer drive wheel and the transducer means 60, but this actual position is shown in FIG. 11.

Back capture block 22 comprises a molded back capture block element 23 and a mounting bracket 24 which is fastened to element 23 with a pair of rivets 24A extending through slotted apertures 24B such that bracket 24 can move sideways a short distance relative to element 23. Back capture block 22 fits over the drum assembly 25 and four apertures 23A therein fit over four mounting posts 14A, 15A, on the back of side bracket arms 14, 15 to precisely locate back capture block 22 relative to the drum assembly 25 and the front capture block 21 as well as the rest of the reader unit. Four slotted apertures 24C in bracket 24 slide into grooves on mounting posts 14A, 15A to captivate back capture block 22 on the mounting block assembly.

After this assembly is completed, the motor bracket and motor can be assembled and fastened in place. The card reader assembly is designed such that all four sides are adapted for carrying the printed wire circuit boards that mount the electronic control elements of the system as shown in the block diagram of FIG. 12 as well as power supply and other system components. The overall assembly of the card reader and control circuit elements is thus extremely compact and can fit into a relatively small space for retrofitting into existing systems or for design into systems being manufactured.

As shown in FIG. 7, a front mounting plate 11 is easily assembled to a front bezel which may also mount an alphanumeric display and a cancel button. Snap tabs 12 shown in FIG. 2 may be used to mount the bezel to frontplate 11 for ease of assembly and disassembly.

From this description of the assembly of the card reader system of this invention it should be apparent that it has a number of distinct advantages over prior art systems. The volume of space required by the reader is quite small, less than cubic inches not including the card swallow bin if provided. The back capture block 22 is easily removed from the assembly without taking the entire unit apart so that a jammed card can easily be removed from the unit. The unit is formed mostly from plastic injection molded parts which are mostly assembled in a snap or slide together fashion, greatly reducing manufacturing piece part and assembly costs. The simplicity of the design provides troublefree operation with little or no scheduled maintenance required.

The design features of the data card reader of this invention also provides flexibility in the feature set of the system. The system may do any one of reading, writing and marking on a data card 50. The swallow feature may be included or not depending on the customers needs. The system is readily adaptable to different marking system, including ink jet, laser marking and the like.

PUNCH AND DIE MEANS 70—STRUCTURE AND OPERATION

Figure 8:
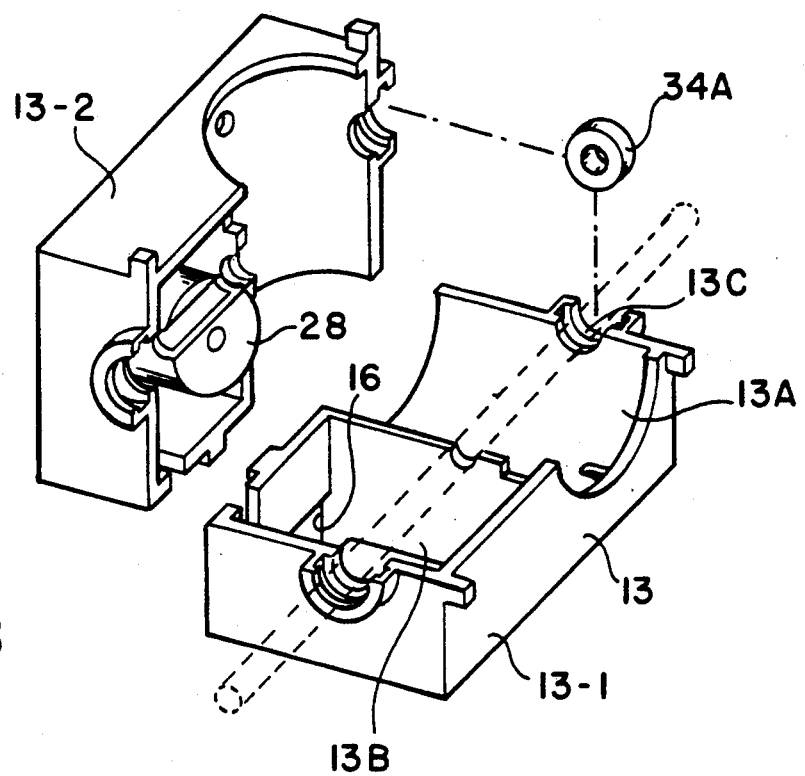
FIG. 8 is an exploded isometric view of a mounting block and other components of a data card read/write apparatus in accordance with this invention.
Figure 9:
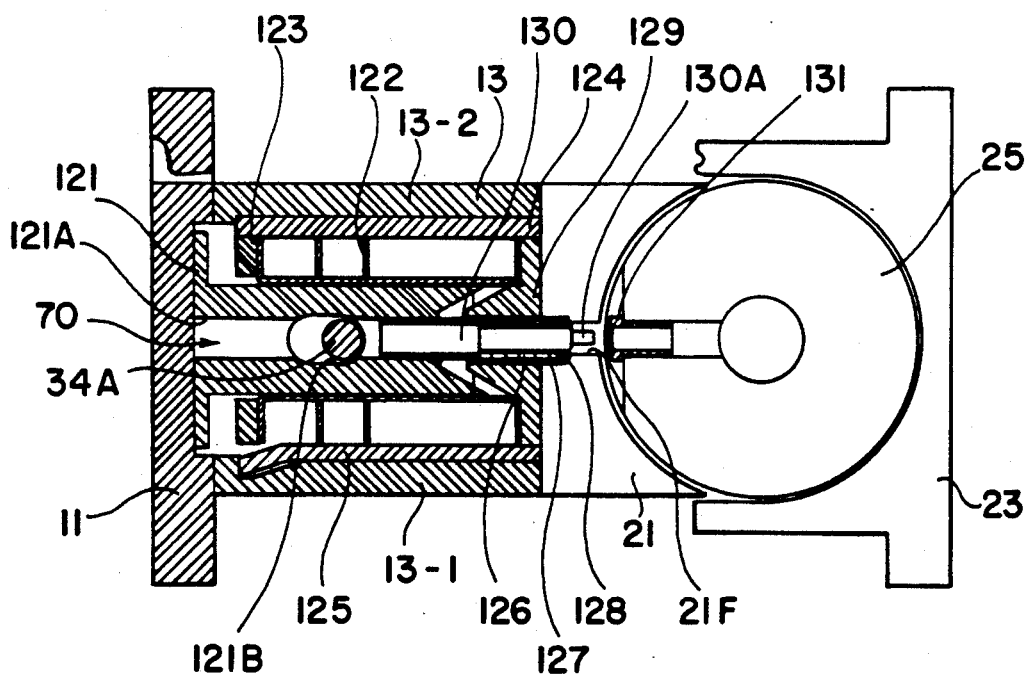
FIG. 9 is a partly sectioned elevation view of a punch and die means incorporated into a data card read/write apparatus in accordance with this invention.

FIGS. 8 and 9 illustrate an embodiment of this invention which incorporates a data card marking means in the form of a punch and die means 70 for forming a hole in the data card 50 aligned with the value track on the form of data card 50 shown in FIGS. 16 and 17. As shown in FIG. 8, mounting block 13 is formed in two molded sections 13-1 and 13-2 which fit together to form a mounting cage for solenoid actuator 28 and a punch solenoid and core structure as shown in FIG. 9. Internal compartment 13B contains the solenoid actuator 28 for the read capture claw means 27 as shown best in FIGS. 5-7. The mounting arrangement for solenoid actuator 28 is a platform 13D shown in FIG. 6 to which solenoid 28 is fastened with a screw through the solenoid case. As shown in FIG. 8, this is a specially constructed solenoid with a portion of the case removed to accommodate the drive shaft 34A which extends through the mounting block 13.

The solenoid actuator for the punch and die means 70 is also specially constructed with a split bobbin 122 which accommodates a hole through the bobbin which receives drive shaft 34A. Plunger 121 has a hollow central core portion which mounts the punch body 130 and also has a slotted aperture extending through it to receive drive shaft 34A while allowing a small amount of punch drive motion between the stationary shaft 34A and the plunger 121. A solenoid cover 124 has a bottom portion which fits into a recessed portion of the cage wall to retain the solenoid drive means in position when the punch and die means 70 is actuated.

Die element 131 is carried on drum assembly 25 at a position which precisely aligns the hole punched in data card 50 with the read/write head element 62A on transducer assembly 62 as shown in FIG. 11. Hub 129 carries a guide bushing 127 through which the punch body 130 travels during the punch drive cycle. A back end portion of guide bushing extends into an aperture 21F formed in front capture block 21 which is part of the self-alignment of the punch and die in the assembly of the reader. Punch guide ring 28 guides the head 131 of the punch accurately relative to the die element 131. Compression spring 126 returns the punch body at the end of the punching cycle.

Although the punch and die means 70 could theoretically be operated while the data card 50 is being driven through the cylindrical card guide path 29, it is preferable for the drive means 30 to be turned off after the data card 50 has been positioned at the desired punch location and thereafter the punch is operated. Preferably the punch is driven multiple times to ensure a clean hole. The chad from the punch will enter the hollow central region of the drum assembly 25 where it can easily be removed during any routine inspection of the system. and the ease of disassembly of the back capture block 22 and the drum assembly 25 from the rest of the unit enables this chad to be cleaned out as part of periodic maintenance on the card reader system.

It should be understood that other marking systems could be used in place of the punch and die means 70 if desired. For example, it would be possible to place a small laser device into the card reader to burn a hole in the card. Another alternative would be to put an ink jet unit into the system for making an ink mark in a selected location on the data card 50. Since the back capture block 22 remains stationary relative to the data card 50 it would also be feasible, if desired, to put a nine wire printhead into the system to actually print alphanumeric data on the card if desired, such as to actually print the amount of value left on the data card 50 for use in a transportation turnstile of a rapid transit system.

The punch and die means 70 is a desirable feature in a prepaid card system which is the initial preferred application environment for the card reader system 5, and its has been incorporated into the system without sacrificing much of the compactness of the overall design. However, it will be appreciated that the system does take up considerable room and the length of the system from front to back could be reduced if this feature were eliminated.

It should also be appreciated that, if a card reader in accordance with this invention but without the card swallow feature were desired, the actuating solenoid 28 for the read capture claw means 27 would be eliminated and the depth of the unit could be reduced by a substantial amount.

MICROCONTROLLER-BASED CONTROL SYSTEM AND METHOD

Figure 12:
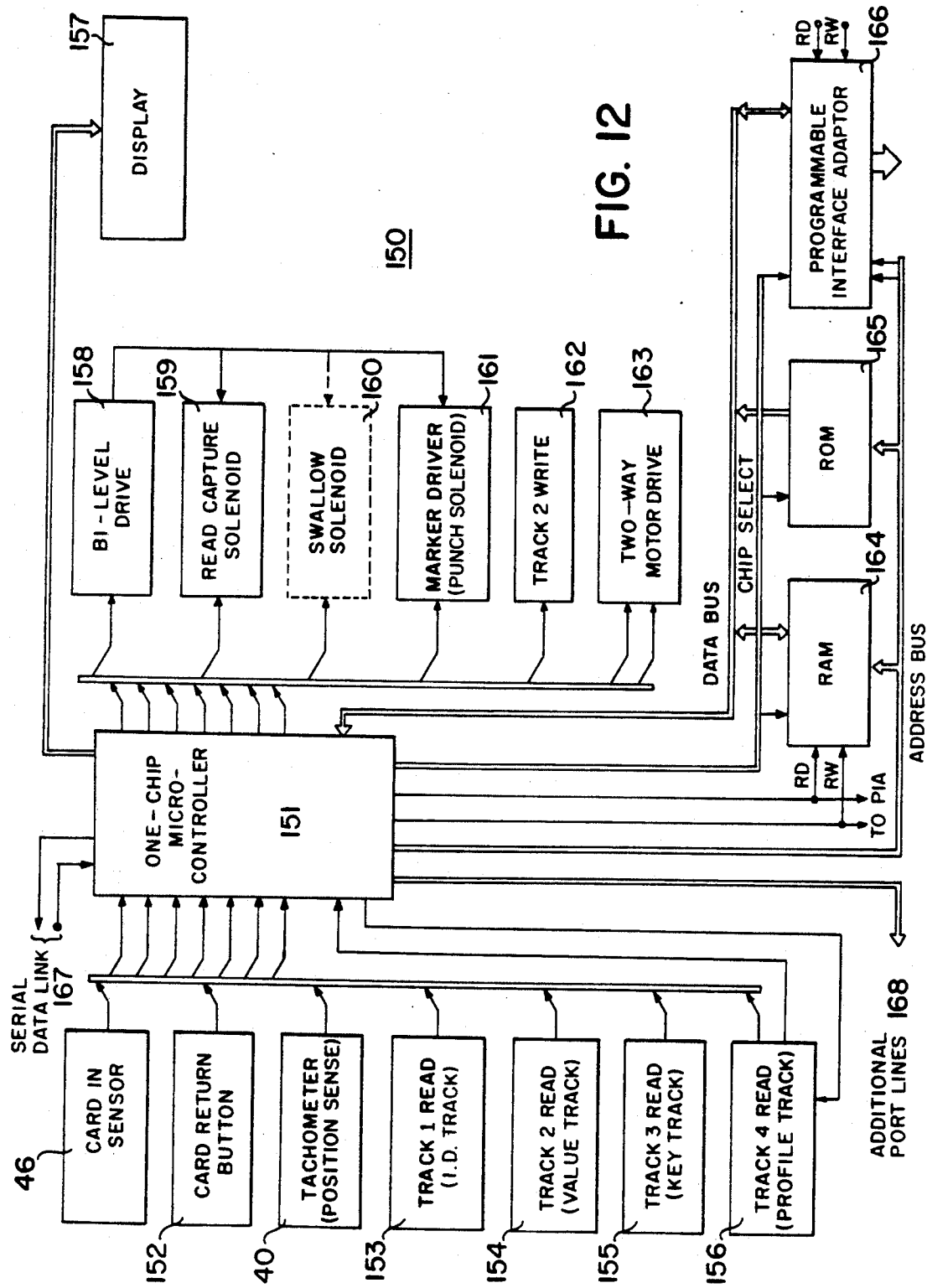
FIG. 12 is a block schematic diagram of a microcontroller based control system for use in controlling the operation of one embodiment of a data card read/write apparatus in accordance with this invention.

FIG. 12 illustrates the major elements of an electronic control and data collection system 150 for a card reader 5 in accordance with this invention. Control system 150 is based on use of a single chip microcontroller 151 of a standard variety, e.g. a 37450 from Mitsubishi Electric Company. Standard support chips such as RAM 164, ROM 165, and programmable Interface Adapter 166 are also utilized with the operating control program stored in ROM 165, and RAM 164 used as memory for storing data parameter values used in control and data read/write operations.

Microcontroller 151 has a number of port lines for input and output. Individual inputs to microcontroller 151 are provided from card-in sensor circuit 46, card return button circuit 152, tachometer circuit 40, Track 1 Read Head Circuit 153, Track 2 Read Head Circuit 154, Track 3 Read Head Circuit 155, and Track 4 Read Head Circuit 156. Microcontroller 151 also sends control and data signals via output ports to Display Circuit 157 (if present), Bi-Level Drive Circuit 158, Read Capture Solenoid Circuit 159 (if a read capture claw means 27 is present in the system), Swallow Solenoid Circuit 160 (if a separate solenoid actuator is required for this feature in a particular embodiment), a Punch Solenoid Circuit 161 (or other marker driver circuit if included in the system), and a Track 2 Write Head Circuit 162, and Motor Drive Circuit 163.

Microcontroller 151 also has a Serial Data Link 167 which may be used to transfer data to another system such as an audit system for a vending machine or a computer which is collecting data. Additional Ports 168 are also available for other input or control functions, and the Programmable Interface Adapter 166 may be used to connect the system to input or output units for various purposes.

It should be understood that an electronic control system for the card reader 5 can take a number of different forms and this invention is not limited to the specific system shown in FIG. 12. It should also be understood that the control system elements shown in FIG. 12 are specific to the presently preferred embodiment of the card reader in a prepaid card environment using a particular form of card security which is available for license from Rand McNally Corporation and is generally disclosed in U.S. Pat. Nos. 4,837,426 and 4,906,988, the disclosures of which are hereby incorporated by reference. Other forms of card security technology could also be readily implemented in the overall system of this invention and would simply require some hardware and programming changes. In addition, it should be understood that the control system could be readily adapted for use with other types of data card 50 technology than the magnetic stripe technology which is used in the particular embodiment used to illustrate the general principles of the invention. Adaptations for reading bar codes in an optical reader environment or for reading other types of data stripes on a data card 50 could be readily made within the performance capabilities of the system disclosed herein.

All of the inputs into microcontroller 151 are essentially interrupt type inputs with the exception of the profile track which does not form a part of this invention. The outputs are also essentially binary outputs or pulse outputs which are handled as to timing and duration by control routines in the overall operating system. These are all well known microcontroller 151 programming and interfacing technologies and do not need to be set forth in detail here for understanding by persons of ordinary skill in that art.

Figure 13:
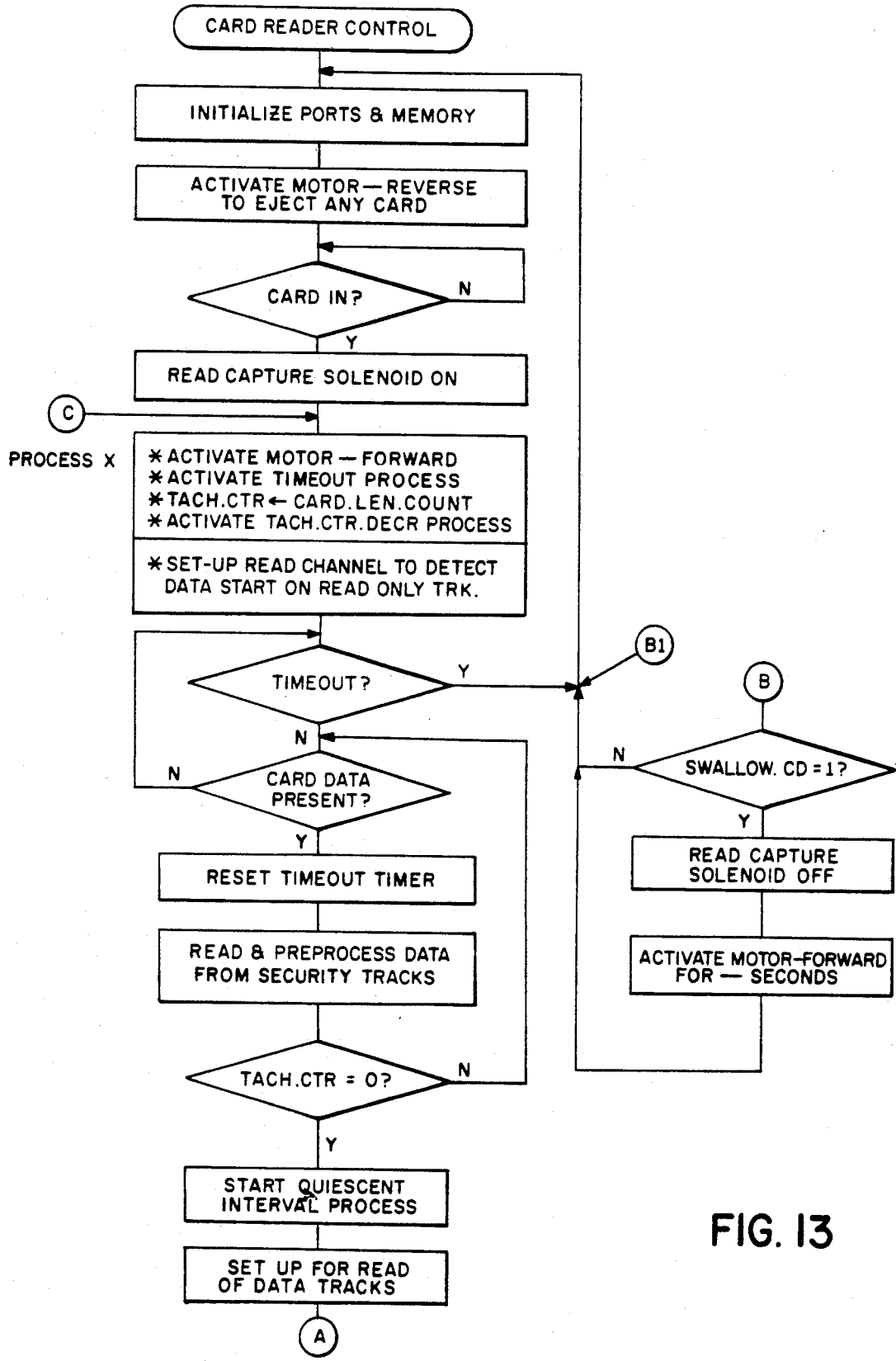
FIGS. 13-15 are software flow charts illustrating process steps involved in controlling operation of one embodiment of a data card read/write apparatus in accordance with this invention.
Figure 14:
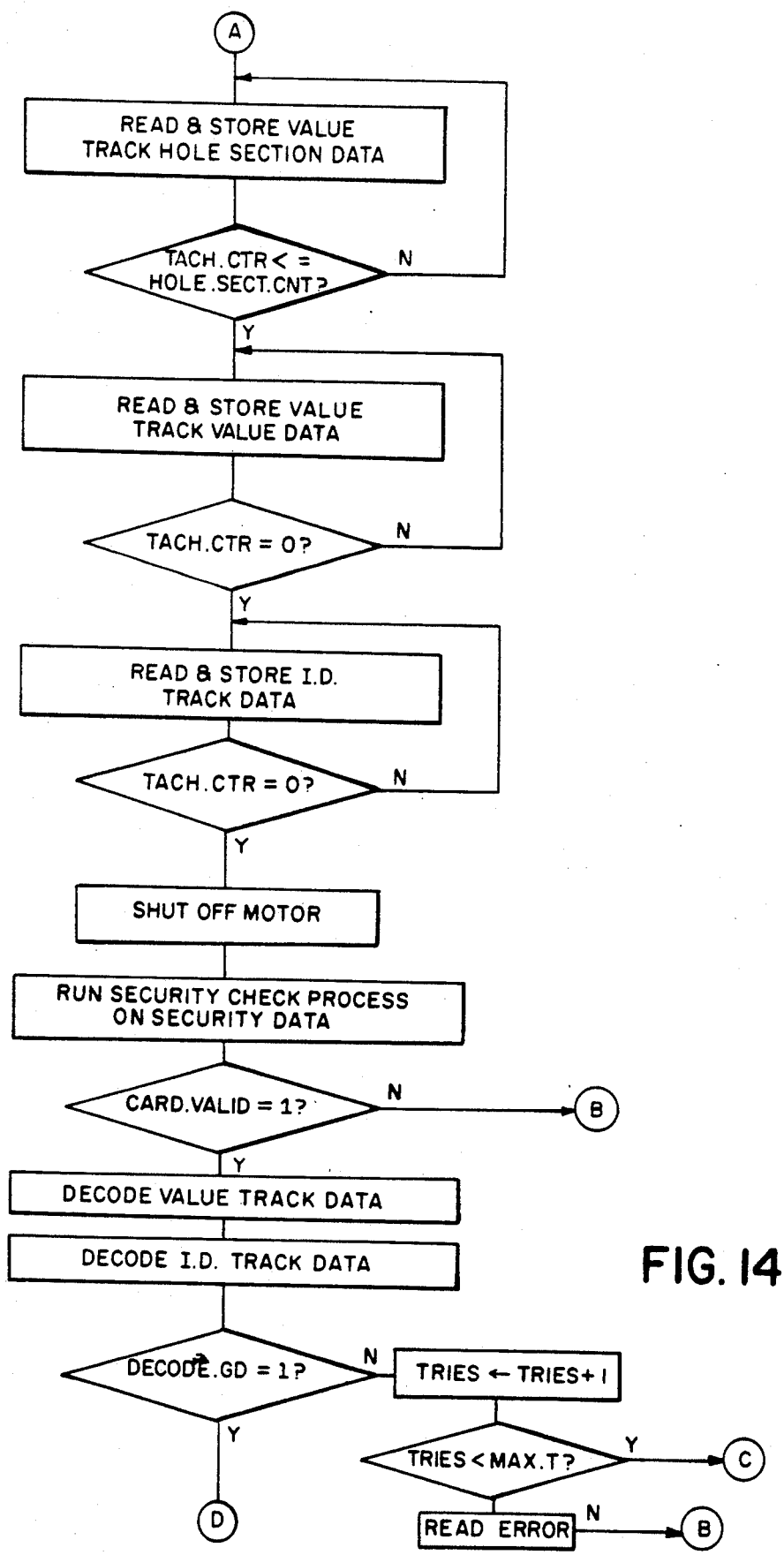
Figure 15:
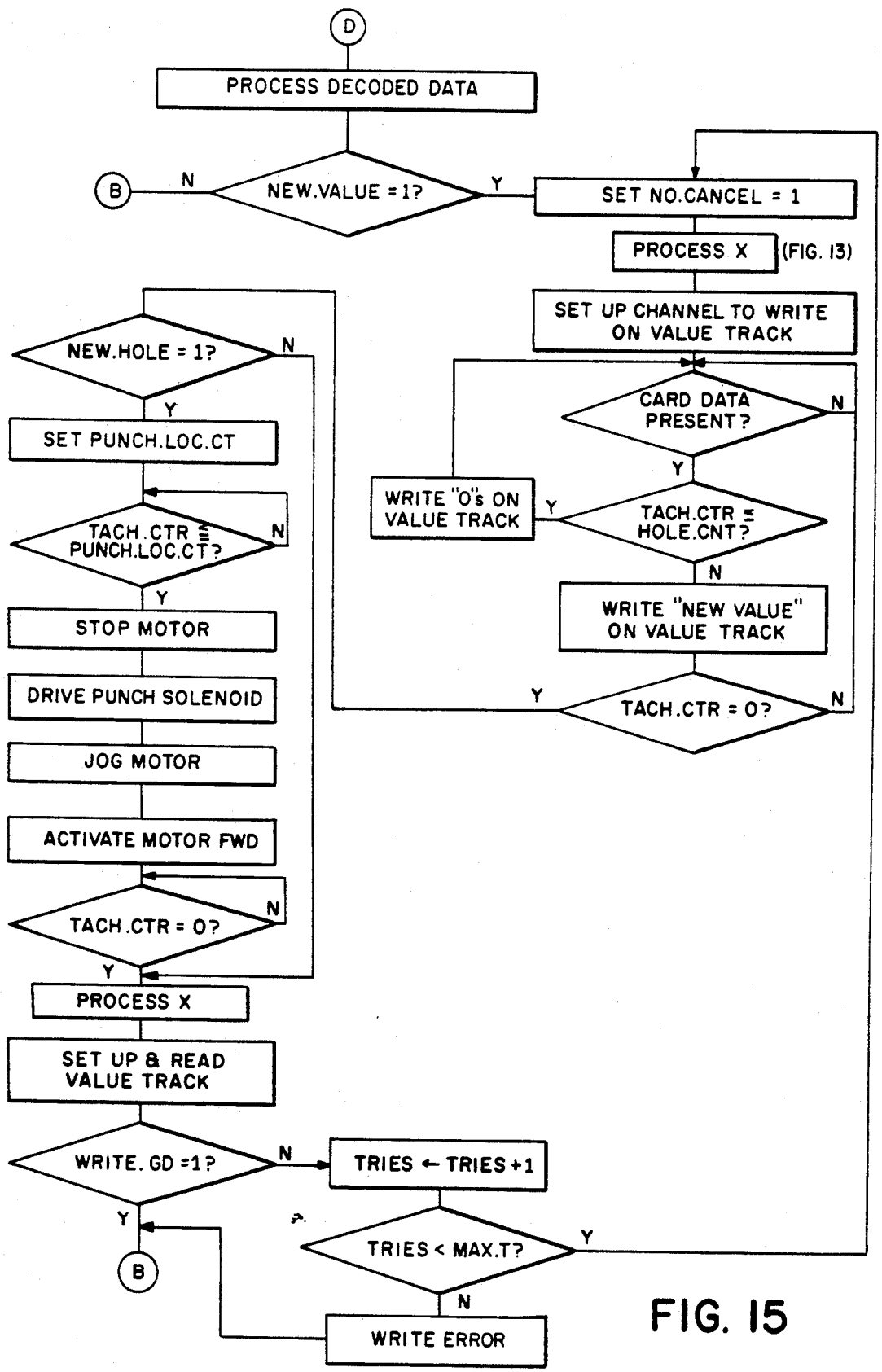

Referring now to FIGS. 13–15 in connection with the other Figures depicting the hardware and the data card 50, an example of the software process steps for controlling the operation of card reader system 5 will be described. The operating software is depicted in FIGS. 13–15 from a high level perspective which is entirely adequate to enable the average software engineer to understand and implement the software control techniques which are set forth.

The card reader control software module of this invention begins with the step of initializing ports and memory, including parameters and data and control function storage registers, to prepare for the sequence of control and data gathering operations to be performed. Following this initialization, a routine to activate the motor in a reverse direction is executed to eject any card that may be present in the system. Simple reverse drive of the motor is all that is required since the guide claw means 26 will automatically allow return ejection of the card if there happens to be one already captured in the cylindrical card guide path 29.

Following this card ejection step, a testing loop is executed to detect entry of a card and sensing of entry by the card-in sensor Circuit 46. When the card in test returns a YES, Read Capture Solenoid Circuit 159 is operated to move the read capture claw means 27 to the card capture position. Following this step a series of processes are spawned and begin to run independently of the control routine depicted. A routine to activate the motor and drive it in a forward direction on a continuous basis is initiated. A timeout process is activated to enable the system to detect such things as a jammed card. This timeout process can be quite complex, but will take into account all of the potential problem or trouble conditions that one may wish to detect on a timeout basis so that appropriate remedial action can be taken. One of the main functions is to check for data being absent for too long a period during a data read cycle which is likely to mean that a card has become jammed in the system. As long as data is present, the timeout timer will be reset.

Another process that is spawned involves setting the TACH.CTR parameter to the value CARD.LEN.-COUNT and then activating a TACH.CTR.DECR process which will decrement the value in TACH.CTR each time a pulse from the tachometer Circuit 40 is received. The parameter CARD.LEN.COUNT is basically the number of output pulses to be received from the tachometer Circuit 40 as the data card 50 is being driven past the transducer means 60 of the system. The current value in the TACH.CTR is thus a measure of the card position relative to the tachometer drive wheel and, accordingly the transducer means 60 which is aligned with the tachometer drive wheel. Were there some offset between the two, then this offset would have to be taken into account in a card position tracking routine in the software.

Another process that is spawned is one to set up a read channel to detect data start on a read only track of the data card 50. This is done so that data collection will be attempted only when it is clear from the presence of data on a read only track that the data card 50 is being scanned over the transducer means 60 of the system. Various forms of error checking may be introduced, such as checking that tachometer pulses start occurring within a short time window before and after start of data on a read only track to verify the the position tracking routine will work properly. As long as card data is present, the timeout timer will be reset. Once presence of initial card data is sensed, the read channels for the security tracks, i.e. Track 3 Read Head Circuit 155 and Track 4 Read Head Circuit 156 are set up and these two tracks are read and preprocessed in sequence to acquire the security data for later processing.

This data acquisition on the security tracks is performed until the value in TACH.CTR is equal to 0, and then a quiescent interval process is started and run since there is a gap in the data card 50 between trailing edge and leading edge. This quiescent interval process involves such things as adjusting for variations in card length, tachometer precision, and the head contact point. All of these adjustments improve the accuracy of the data processing from the system.

Following this the system is set up for reading data tracks and then a process to read and store the data from the value track hole section (section 56A in FIG. 17). During this process the timing values between transitions in the F2F data signal on the magnetic track are accumulated and stored for later processing, generally using the concept disclosed in Chang et al. U.S. Pat. No. 4,788,020, the disclosure of the post-processing decoding approach therein being incorporated herein by reference.

The timing pattern data from the hole section of the value track is read and stored until the value in TACH.CTR is less than or equal to a value HOLE.-SECT.CNT which indicates that the data card 50 has been driven past the transducer means 60 to a position such that the hole section is past the transducer means 60. Next the system reads and stores the value data from the value track until the count in the TACH.CTR is equal to 0, indicating that the entire length of value track 56A and 56B on data card 50 has been scanned.

The same quiescent interval process and set up process for the next data track are performed as discussed previously, but these steps are not shown on the diagram of FIG. 14. This includes setting the TACH.CTR to CARD.LEN.COUNT and activating the decrement process as before. On the next pass of data card 50 through the cylindrical card guide path 29, the I.D. track data is read and stored. This process continues until the value in TACH.CTR has decremented to zero.

At this point in the process, all of the magnetic tracks on data card 50 have been scanned and all of the data recorded in RAM 164 so the microcontroller 151 shuts off the motor via Motor Drive Circuit 163. Next a card security check process is run on the security data that was previously accumulated to determine if the card being read is valid. If the test for card validity returns a NO, i.e. the parameter CARD.VALID was set to 0 value, the process returns to Point B on FIG. 13, and a test is performed to determine if the parameter SWALLOW.CD has been set to a value 1. The security checking process may or may not result in a decision to swallow the card, depending on what the application writer has decided to include in that process. If SWALLOW.CD has a value 1, then the read capture claw solenoid is turned off to establish the swallow card path 29D as the path that the card will take. The motor is then activated in a forward direction for set period of time to drive the card into the swallow bin. Thereafter the process returns to the initialization step to await entry of another data card 50.

If the SWALLOW.CD parameter has a value 0 even though the card security test resulted in declaring an invalid card, then the test for the value of SWAL- LOW.CD will return a NO, and the process will go back to the initialization step and eject the card and then turn of the motor as a preliminary to waiting for the CARD.IN test to declare the presence of another data card 50.

Now, if the test on the value of parameter CARD.-VALID returns a YES, the process continues with execution of two sequential routines to decode the value track data and the I.D. track data. These routines may or not successfully decode the data based on the stored timing patterns in RAM 164. If one or both of the sets of data is not decoded successfully, then the parameter DECODE.GD is set to a value of 0 and the decision step based on that parameter value will return a NO. When this occurs, the value of the TRIES parameter is incremented by 1 and a testing step on the TRIES parameter determines if its value exceeds a fixed parameter value of MAX.T. If that testing step returns NO, that means that the system has tried a sufficient number of times to get a good decode and has failed. Accordingly a READ ERROR is declared and the program execution returns to point B to perform the SWALLOW.CD test and the remainder of that portion of the program as previously described. If the testing step on TRIES returns a YES, then the program execution returns to point C to start the card reading process all over again. Alternatively program execution could jump to reading just the value track and the I.D. track if desired.

If the DECODE.GD parameter test returns a YES, then as shown in FIG. 15, the decoded data is processed according to the application program and any activity that is to be performed relative to the data card 50. If that processing results in setting the value of NEW.-VALUE to 0, then the test for the value of the parameter NEW.VALUE will return NO, and program execution will return to point B on FIG. 13. At this point, the SWALLOW.CD test is performed and it is possible that the data processing on the card may have set that SWALLOW.CD parameter to 1, e.g. if this were a promotional one-time use card and the issuer wished to swallow the card for a physical count as well as any electronic data collection that may be performed by the system.

The balance of the operation from point B has already been described above and need not be repeated. If the value of NEW.VALUE was set to 1 by the data processing of the application program, then the program executes a step to set the NO.CANCEL parameter to 0. While all of the main processing is going on, the cardholder might hit the cancel button, which would under most circumstances interrupt the process and return it to point B1 to eject the card without further processing. However, if the data processing on the data card 50 results in the need to write a new value, then setting the NO.CANCEL parameter to 0, tell the microcontroller 151 not to respond to a cancel signal from the cancel button even if one arrives. The process X steps shown on FIG. 13 are then performed and a channel is set up to write data on the value track. The program then waits for card data to be present on a read only track, and following that during a period up to the time that the value of TACH.CTR is equal to HOLE.CNT a sequence of 0 values is written on the value track, i.e. the hole section 56A of the value track. Following that, when the test for TACH.CTR being less than or equal to HOLE.CNT returns a NO, the New Value data is written on the value track.

During this data writing process, the tachometer and the position count that it produces is utilized by the program to determine the length of each data bit so that the data is written accurately on the value track even if the speed of the card past the write head varies. This helps to ensure that the New Value data will be accurately decoded the next time data card 50 is put into the card reader and read.

When the value track data writing is completed, and the test for TACH.CTR equal to zero returns a YES, a test on the value of NEW.HOLE is performed to determine if the data processing step set that parameter value to 1. If this test returns NO, then a sequence of steps is performed to read the value track and determine that the New Value data is accurately readable. If the test for a good write returns a NO, i.e. WRITE.GD was not set to 1, then the program increments the TRIES counter and check to see if the number of tries exceeds a maximum. The program will keep trying to make a good write of the New Value until the TRIES counter exceeds the value set in the MAX.T parameter. If this count is exceeded a WRITE ERROR is declared and the program goes back to point B to eject the card. Similarly, if the write is good and the value of WRITE.GD has been set to 1, then the program returns to point B and the card is ejected.

Returning now to the test on the parameter NEW.HOLE, if that test returns a YES, then the value of PUNCH.LOC.CT is set depending on the position of the hole to be punched which is determined by the data processing program routine which set NEW.HOLE to a value 1. Data card 50 is driven forward until the test for TACH.CTR equal to or less than PUNCH.LOC.CT returns a YES, and then the motor is stopped and a routine to drive the punch solenoid is executed. This may involve driving the punch several times to make sure that a clean hole has been formed. Then the motor is jogged forward and backward a bit to make sure that the punch has retracted from the data card 50. Then the motor is activated in the forward direction again and the card is driven until the value of TACH.CTR goes to 0. Then the steps to read and check the New Value written are executed as previously described.

It should be understood that this control and data collection software routine is just one of several approaches to achieving the functionality needed that could be implemented. It should also be understood that it is related to the hardware aspect of the control system and variations in both are possible within the principles of this invention. For example, the data from the various data tracks on the magnetic stripe of data card 50 might be processed in a separate data reading and decoding chip, either in serial or parallel, with the data being available for read by the microcontroller 151 without it having to store data parameters and do any decoding itself. If the marking system used is different than the punch, for example if a dot matrix or other printer mechanism is employed, then print routines will be executed rather than a hole punching routine. All of these variations due to changes in hardware features are well within the skill of the average software engineer to implement and the details of the program modifications required do not need to be set forth herein.

It should also be understood that additional hardware elements might be added to the system, if desired. For example, if more sophisticated monitoring of system performance were desired, optical sensors could be used to determine that a data card 50 has passed through the card swallow path. A sensor could also be positioned to determine the position of the punch drive to determine that the punch is operating correctly. All of these additional features can be implemented readily within the system as described, but some may require enlargement of the size of the unit.

The card reader system of this invention has been described above in various embodiments as examples of the principles of the invention, and it should be understood that numerous additional modifications could be made without departing from the scope of this invention as claimed in the following claims.

What is claimed is:

1. Apparatus for reading a data card which comprises a thin, flexible medium which is capable of being flexed more than 180 degrees into a cylindrical shape, said data card having leading and trailing edges and a data stripe formed thereon at a prearranged location and extending transverse to said leading and trailing edges, said apparatus comprising card guide means defining a cylindrical card guide path and an entrance slit for accepting said data card into said cylindrical card guide path;

drive means cooperatively associated with said card guide means for driving said data card through said entrance slit into and repeatedly around said cylindrical card guide path; and transducer means positioned at a prearranged location on said cylindrical card guide path for detecting data on said data stripe of a data card being driven around said cylindrical card guide path by said drive means;

said entrance slit defined by said card guide means comprising a card-in/out slit operative during a card capture time period to admit said data card into said cylindrical card guide path and operative during a card discharge time period to allow discharge of said data card from said cylindrical card guide path;

said card guide means further comprising a guide claw means having a guide finger portion located at said card-in/out slit and movable between a card in-out position and a card guide position and spring biasing means for biasing said guide finger portion toward said card in-out position, said card in-out position permitting free movement of said data card through said card-in/out slit during both said card capture time period and said card discharge time period; and said guide finger portion being moved into said card guide position by the leading edge of a data card being driven around said cylindrical card guide path to provide a smooth guided movement of said data card at the position of said card-in/out slit;

said drive means comprising a bidirectional drive means for driving said data card alternatively in a forward direction to drive said data card forwards through said entrance slit and around said cylindrical card guide path thereby to scan said data stripe thereon past said transducer means and in a reverse direction to drive said data card backwards through said entrance slit to discharge said data card from said card guide means.

2. Apparatus as claimed in claim 1, wherein
   said card-in/out slit is located at an upper portion of said cylindrical card guide path;
   said card guide means further defines a card swallow path including a card swallow slit located at a position on said cylindrical card guide path separated from said entrance slit;
   and said card guide means further includes:
   a read capture claw means having a guide finger portion located at said card swallow slit and movable between a card capture position and a card swallow position;
   spring biasing means for biasing said guide finger portion of said read capture claw means toward said card swallow position; and
   actuator means for selectively moving said guide finger portion of said read capture claw means to said card capture position thereby to capture said data card in said cylindrical card guide path and to smoothly guide said captured data card at the location of said card swallow slit.

3. Apparatus as claimed in claim 1, wherein
   said combined card-in/out slit is positioned at a lower portion of said cylindrical card guide path; and
   said apparatus further comprises:
   card input guide means defining a card insert slot and a linear card guide path between said card insert slot and said card-in/out slit;
   a card swallow guide means defining a card swallow path communicating with said linear card guide path; and
   diverter means operatively associated with said card input guide means and said card swallow guide means for selectively establishing one of said linear card guide path and said card swallow path as the effective discharge path for said data card during said card discharge time period.

4. Apparatus for reading a data card which comprises a thin, flexible medium which is capable of being flexed more than 180 degrees into a cylindrical shape, said data card having leading and trailing edges and a data stripe formed thereon at a prearranged location and extending transverse to said leading and trailing edges, said apparatus comprising card guide means defining a cylindrical card guide path and an entrance slit for accepting said data card into said cylindrical card guide path;

drive means cooperatively associated with said card guide means for driving said data card through said entrance slit into and repeatedly around said cylindrical card guide path; and transducer means positioned at a prearranged location on said cylindrical card guide path for detecting data on said data stripe of a data card being driven around said cylindrical card guide path by said drive means;

said card guide means further defining a card exit slit separated from said entrance slit; and said card guide means including
   a guide claw means having a guide finger portion located at said entrance slit and movable between a card-in position and a card guide position;
   first spring means for biasing said guide finger portion of said guide claw means toward said card-in position;
   a read capture claw means having a guide finger portion located at said card exit slit and movable between a card capture position and a card exit position;

spring biasing means for biasing said guide finger portion of said read capture claw means toward said card exit position; and actuator means for selectively moving said guide finger portion of said read capture claw means to said card capture position;

said card-in position of said guide finger portion of said guide claw means permitting free movement of said data card through said entrance slit during a card capture time period and said guide finger portion being moved into said card guide position by the leading edge of a data card being driven around said cylindrical card guide path to provide a smooth guided movement of said data card at the location of said entrance slit;

said card capture position of said guide finger portion of said read capture claw means providing for capture of said data card in said cylindrical card guide path and smooth guidance of said captured data card at the location of said card exit slit;

said card exit position of said guide finger portion of said read capture claw means permitting discharge of a data card through said card exit slit during a card discharge time period.

5. Apparatus as claimed in claim 4, wherein said entrance slit is defined at an upper portion of said card guide means;

said exit slit is defined at a lower portion of said card guide means; and said apparatus further comprises:

card exit guide means defining a card exit slot and a card guide exit path between said card exit slot and said exit slit;

a card swallow guide means defining a card swallow path communicating with said card guide exit path; and diverter means operatively associated with said card exit guide means and said card swallow guide means for selectively establishing one of said card guide exit path and said card swallow path as the effective discharge path for said data card from said cylindrical card guide path during said card discharge time period.

6. Apparatus as claimed in claim 1, wherein said card guide means comprises:

a capture block means having a cylindrical internal cavity forming outer wall surfaces of said cylindrical card guide path and an entrance slit forming an opening to said cylindrical internal cavity, a forward portion of a top wall section of said capture block means serving as a bottom wall portion of a linear card guide for guiding a data card into said entrance slit; and a drum assembly being received within said cylindrical internal cavity and having an outer cylindrical surface forming inner wall surfaces of said cylindrical card guide path;

and said drive means comprises:

a pair of drum wheels mounted for rotation on opposite ends of said drum assembly and extending outside said capture block means with a separation distance between said drum wheels corresponding generally to the width of said data card;

a drive shaft with a pair of pulleys thereon mounted forward of said capture block means with said pulleys being separated from each other by a distance greater than the width of said data card and having a diameter larger than the diameter of said drum wheels;

a pair of drive belts extending over said pair of pulleys and over said drum wheels; and and motor means for driving said drive shaft to turn said pulleys and thereby to drive said drive belts and said drum wheels;

and said apparatus further comprises an entrance card guide for guiding said data card toward said entrance slit and into driving engagement between said pair of drive belts and said drum wheels whereby the leading edge portion of said data card is pulled by said drive belts and drum wheels through said entrance slit and said data card is then driven completely into said cylindrical card guide path;

said transducer means being mounted to said drum assembly at said prearranged location relative to said cylindrical card guide path.

7. Apparatus as claimed in claim 6, wherein said card guide means and said drive means are carried on support means comprising:

a mounting block having a frontplate carried on a front surface thereof and having a card inlet/outlet slit formed therein communicating with a top wall surface of said mounting block serving as a bottom wall portion of said entrance card guide;

a pair of side bracket means mounted one on each side of said mounting block, each of said side bracket means having a mounting bracket arm extending backward from said mounting block and adapted for mounting said card guide means therebetween such that said top wall portion of said mounting block is aligned with said forward portion of a top wall section of said capture block means to form a complete bottom wall portion of a linear card guide from said inlet/outlet slot to said entrance slit in said capture block means; each of said side bracket means having a vertical wall section extending above said mounting block and said capture block means to form side wall portions of a linear card guide leading to said entrance slit on said card guide means;

said drive shaft and pulley assembly being carried on said mounting block behind said frontplate, said pair of pulleys being spaced from each other by a distance greater than the separation between said drum wheels on said drum assembly and having a diameter greater than the diameter of said drum wheels thereby to allow said entrance card guide to be located between said pair of pulleys;

a motor assembly being mounted on an outer side surface of one of said side bracket means and being coupled in driving relation to said drive shaft and pulley assembly;

a pair of upper and lower drive belt guide wheels being mounted on said side bracket means immediately forward of the position of said entrance slit on said card guide means for directing each of said drive belts onto a respective one of said drum wheels carried on said drum assembly whereby a data card inserted through said inlet/outlet slot is accurately guided along said linear card guide path toward said entrance slit until respective edge portions of said data card are engaged between said drive belts and said drum wheels and thereafter driven through through said entrance slit into said cylindrical card guide path.

8. Apparatus as claim in claim 7, wherein said entrance slit in said capture block means is a card-in/out slit operative during a card capture time period to admit said data card into said cylindrical card guide path and operative during a card discharge time period to allow discharge said data card from said cylindrical card guide path;

said card guide means includes a guide claw means mounted in said capture block means and having a guide finger portion located at said card-in/out slit, said guide claw means being movable between a card in-out position and a card guide position and spring means for biasing said guide finger portion toward said card in-out position, said card in-out position positioning said guide finger portion adjacent said inner wall surfaces of said cylindrical card guide path to permit free movement of said data card through said card-in/out slit during both said card capture time period and said card discharge time period entrance slit; and said guide finger portion being moved into said card guide position separated from said inner wall surfaces of said cylindrical card guide path by the leading edge of a data card being driven around said cylindrical card guide path and thereby providing a smooth guided movement of said data card at the position of said card-in/out slit; and said drive motor is a bidirectional drive motor means for driving said pair of pulleys, and correspondingly said drive belts and drum wheels of said drive means alternatively in a forward direction to drive said data card forwards through said entrance slit and around said cylindrical card guide path thereby to scan said data stripe thereon past said transducer means and in a reverse direction to drive said data card backwards through said entrance slit to discharge said card from said card guide means.

9. Apparatus as claimed in claim 8, wherein said capture block means comprises a front capture block having a backward facing semi-cylindrical concave surface forming one half of said cylindrical internal cavity of said capture block means; and a back capture block having a frontward facing semi-cylindrical concave surface forming the other half of said cylindrical internal cavity of said capture block means;

said front capture block having said drum assembly mounted thereto, and said back capture block being mounted over said drum assembly and forming with said front capture block said card-in/out slit at an upper portion of said cylindrical card guide path; said front capture block and said back capture block further forming a card swallow slit located at a lower portion of said cylindrical card guide path said guide claw means being mounted to said back capture block and said capture block means further comprising:

a read capture claw means mounted to said back capture block and having a guide finger portion located at said card swallow slit and movable between a card capture position and a card swallow position;

spring biasing means for biasing said guide finger portion of said read capture claw means toward said card swallow position; and actuator means mounted on said mounting block for selectively moving said guide finger portion of said read capture claw means to said card capture position, said card capture position being characterized by said guide finger portion being spaced away from said inner wall surfaces of said cylindrical internal cavity to capture said data card in said cylindrical card guide path and provide a smooth continuous guidance of said data card around said cylindrical card guide path in the vicinity of said card swallow slit, and said card swallow position being characterized by said guide finger portion being positioned adjacent said inner wall surfaces of said cylindrical internal cavity to allow said data card to pass into said card swallow slit.

10. Apparatus as claimed in claim 8, wherein said capture block means comprises a front capture block having a backward facing semi-cylindrical concave surface forming one half of said cylindrical internal cavity of said capture block means; and a back capture block having a frontward facing semi-cylindrical concave surface forming the other half of said cylindrical internal cavity of said capture block means;

said front capture block having said drum assembly mounted thereto, and said back capture block being mounted over said drum assembly and forming with said front capture block said card-in/out slit at a lower portion of said cylindrical card guide path; and said apparatus further comprises:

card input guide means defining a card insert slot and a linear card guide path between said card insert slot and said card-in/out slit;

a card swallow guide means defining a card swallow path communicating with said linear card guide path; and diverter means operatively associated with said card input guide means and said card swallow guide means for selectively establishing one of said linear card guide path and said card swallow path as the effective discharge path for said data card during said card discharge time period;

said guide claw means being mounted to said back capture block at the location of said card-in/out slit.

11. Apparatus as claimed in claim 7, wherein said entrance slit in said capture block means is a card-in slit operative during a card capture time period to admit said data card into said cylindrical card guide path; and said card guide means further defines a card-out slit separated from said card-in slit and being operative during a card discharge time period to provide for discharge of said data card from said cylindrical card guide path; and wherein said capture block means comprises a front capture block having a backward facing semi-cylindrical concave surface forming one half of said cylindrical internal cavity of said capture block means; and a back capture block having a frontward facing semi-cylindrical concave surface forming the other half of said cylindrical internal cavity of said capture block means;

said front capture block having said drum assembly mounted thereto, and said back capture block being mounted over said drum assembly and forming with said front capture block said card-in slit located at one of an upper or lower portion of said cylindrical card guide path and said card-out slit located on said cylindrical card guide path opposite said card-in slit;

said card guide means further including
a guide claw means mounted on said front capture block and having a guide finger portion located at said card-in slit, said guide claw means being movable between a card-in position and a card guide position;
first spring means for biasing said guide claw means toward said card-in position,
a read capture claw means mounted on said front capture block hand and having a guide finger portion located at said card-out slit, said read capture claw means being movable between a card capture position and a card exit position;
second spring biasing means for biasing said read capture claw means toward said card exit position; and
actuator means for selectively moving said read capture claw means to said card capture position;
said card-in position of said guide claw means being characterized by said said guide finger portion being positioned adjacent said inner wall surfaces of said cylindrical card guide path to permit free movement of said data card through said card-in slit during said card capture time period and said guide finger portion being moved into said card guide position separated from said inner wall surfaces of said cylindrical card guide path by the leading edge of a data card being driven around said cylindrical card guide path and thereby providing a smooth guided movement of said data card at the position of said card-in slit;
said card capture position of said read capture claw means being characterized by said guide finger portion being spaced away from said inner wall surfaces of said cylindrical internal cavity to capture said data card in said cylindrical card guide path and provide a smooth continuous guidance of said data card around said cylindrical card guide path in the vicinity of said card swallow slit, and said card-exit position of said read capture claw means being characterized by said guide finger portion being positioned adjacent said inner wall surfaces of said cylindrical internal cavity to allow said data card to pass into said card-exit slit;

and said apparatus further comprises:
card exit guide means defining a card exit slot and a linear card exit guide path between said card exit slot and said card exit slit;
a card swallow guide means defining a card swallow path communicating with said linear card exit guide path; and
diverter means operatively associated with said card exit guide means and said card swallow guide means for selectively establishing one of said linear card exit guide path and said card swallow path as the effective discharge path for a data card being driven through said exit slit of said capture block means during said card discharge time period.

12. Apparatus as claimed in claim 11, wherein
said card-in slit is located at an upper portion of said drum assembly and said card-out slit is located at a lower portion of said drum assembly;
and said apparatus further comprises:
card exit guide means defining a card exit slot and a card exit guide path between said card exit slot and said card slit;
a card swallow guide means defining a card swallow path communicating with said linear card guide exit path; and
diverter means operatively associated with said card exit guide means and said card swallow guide means for selectively establishing one of said linear card guide path and said card swallow path as the effective discharge path from said cylindrical card guide path for said data card during said card discharge time period.

13. Apparatus as claimed in claim 9, wherein
said front capture block is mounted in a pair of recesses on said side bracket means dimensioned to receive and accurately position said front capture block in relation to said mounting block;
said drum assembly is mounted to said front capture block in an accurately registered orientation by means of a pair of cooperative location pin and aperture arrangements; and
said back capture block includes a mounting bracket for mounting said back capture block in an accurately registered position over said drum assembly using cooperative fastening means associated with said mounting bracket and said side bracket means.

14. Apparatus as claimed in claim 13, wherein
said guide finger portion of each of said guide claw means and said read capture claw means comprises a plurality of separated guide fingers having finger end portions curved generally to match the curvature of said cylindrical card guide path;
said front capture block has a plurality of separated channels formed in upper and lower portions thereof for receiving said separated guide fingers of said guide claw means and said read capture claw means, respectively;
a forward edge portion of each of said guide finger portions being positioned between a forward facing surface of said front capture block and said mounting block and forming a natural hinge mounting arrangement permitting rotation of said guide finger portion within said separated channels
said guide claw means further comprising an actuator tab extending downward from said guide finger portion and having a compression spring means mounted thereon and adapted to be received in a locating aperture in said back surface of said front capture block to bias said guide finger portion toward said card in-out position;
said read capture claw means further comprising an actuator tab extending forwardly from said guide finger portion and carrying a compression spring means thereon and received in an aperture in said mounting block to bias said guide finger portion thereon toward said card swallow position,
said actuator means being mounted in said mounting block and acting on said actuator tab on said read capture claw means to drive said guide finger portion thereon into said card capture position.

15. Apparatus as claimed in claim 14, further comprising a punch and die means cooperatively mounted in said mounting block, said back capture block and said drum assembly; said punch and die assembly including a solenoid operated plunger core means mounted within said mounting block and carrying said punch means; a punch guide bushing being mounted in a hub on a back portion of said solenoid and being received in a registration aperture formed in said forward facing surface of said front capture block and a compression punch return spring being carried in said punch guide bushing to bias said plunger core and punch to a retracted position; said die assembly being mounted in said drum assembly in an accurately registered position in the plane of said cooperative location pin and aperture arrangements which position said drum assembly relative to said front capture block to provide automatic alignment of a die aperture in said die assembly with said punch element.

16. Apparatus as claimed in claim 15, wherein said drive shaft on which said pair of pulleys is mounted extends through said said solenoid operated plunger of said punch means; said solenoid operated plunger comprises a bobbin having an aperture therethrough receiving said drive shaft with separate first and second winding supporting bobbin sections extending forward and rearward from said aperture and carrying first and second solenoid winding sections thereon; said plunger core means having a slot therein for receiving said drive shaft and accommodating driving movement of said plunger core relative to said drive shaft.

17. Apparatus as claimed in claim 16 adapted for reading a data card with a magnetic stripe thereon and wherein
said transducer means is a magnetic read head mounted on said drum assembly at a prearranged position to detect data on said magnetic strip as said data card is driven around said cylindrical card guide path; and
said punch and die means is mounted in a position aligned with said transducer means and is operable to punch a hole in said magnetic strip which can be sensed by said magnetic read head.

18. Apparatus as claimed in claim 13, wherein said drum assembly comprises:
a pair of complementary drum sections adapted to snap together to form a cylindrical drum, each of said drum sections having a hollow core extending through a central portion thereof and a central hub section on a free end thereof with a split outer mounting hub section having a retaining lip thereon.
a pair of drum flange elements having a hollow central core, each of said drum flange elements being mounted over one of said split mounting hub sections and being retained thereon by said retaining lip;
and each of said drum wheels comprises a cylindrical drum belt carrier journalled for rotation on one of said drum flange elements and carrying a resilient tire member on an outer cylindrical surface thereof.

19. Apparatus as claimed in claim 18 adapted for reading a data card having a pair of magnetic strips thereon with each magnetic strip having at least one track of data thereon and wherein
said transducer means comprise a pair of magnetic pick up units each with at least one magnetic read head thereon;
each of said complementary drum sections defining a mounting channel for receiving one of said magnetic pick up units in a radially slidable relationship with said magnetic read head thereon facing said cylindrical card guide path;
a leaf spring element having two complementary leaf spring sections thereon extending in opposite directions from a central mounting section;
each of said complementary drum sections defining one half of a spring retainer channel adapted to receive a portion of said central mounting section of said leaf spring for capturing said central mounting section in said retainer channel when said complementary drum sections are snapped together;
said complementary leaf spring sections each contacting a bottom portion of an associated one of said magnetic pick up units for biasing said magnetic pick up unit toward an outer wall surface of said cylindrical internal cavity and thereby ensuring good magnetic signal pick up contact between said magnetic read head and said magnetic strip on a data card driven through said cylindrical card guide path.

20. Apparatus as claimed in claim 7, further comprising
a card-in sensor mounted on said mounting block in a prearranged relationship to said entrance card guide for detecting the presence of a data card therein; and
a card position sensor means mounted on one of said side bracket means and having a drive wheel extending into an edge portion of said cylindrical card guide path and adapted to contact an edge portion of a data card being driven through said cylindrical card guide path.

21. Apparatus as claimed in claim 2, further comprising marker means operatively associated with said card guide means for marking a prearranged indicia on said data card.

22. Apparatus as claimed in claim 20, wherein
said card guide means comprises:
a capture block means having a cylindrical internal cavity forming outer wall surfaces of said cylindrical card guide path and an entrance slit forming an opening to said cylindrical internal cavity, a forward portion of a top wall section of said capture block means serving as a bottom wall portion of a linear card guide for guiding a data card into said entrance slit; and
a drum assembly being received within said cylindrical internal cavity and having an outer cylindrical surface forming inner wall surfaces of said cylindrical card guide path;
and said drive means comprises:
a pair of drum wheels mounted for rotation on opposite ends of said drum assembly and extending outside said capture block means with a separation distance between said drum wheels corresponding generally to the width of said data card;
a drive shaft with a pair of pulleys thereon mounted forward of said capture block means with said pulleys being separated from each other by a distance greater than the width of said data card and having a diameter larger than the diameter of said drum wheels;
a pair of drive belts extending over said pair of pulleys and over said drum wheels; and and motor means for driving said drive shaft to turn said pulleys and thereby to drive said drive belts and said drum wheels;

and said apparatus further comprises an entrance card guide for guiding said data card toward said entrance slit and into driving engagement between said pair of drive belts and said drum wheels whereby the leading edge portion of said data card is pulled by said drive belts and drum wheels through said entrance slit and said data card is then driven completely into said cylindrical card guide path;

said transducer means being mounted to said drum assembly at said prearranged location relative to said cylindrical card guide path;

said marker means comprising a punch and die means including punch means mounted relative to said capture block means and adapted to drive a punch head element toward said drum assembly; and a die element mounted in said drum assembly in alignment with said punch head element for receiving said punch head element when driven through said data card;

and said apparatus further comprising control means for controlling said motor means to drive said data card to a predetermined position within said cylindrical card guide path and thereafter to operate said punch means to punch a hole in said data card at said predetermined position.

23. Apparatus as claimed in claim 22, wherein
said card guide means and said drive means are carried on support means comprising:

a mounting block having a frontplate carried on a front surface thereof and having a card inlet/outlet slit formed therein communicating with a top wall surface of said mounting block serving as a bottom wall portion of said entrance card guide;

a pair of side bracket means mounted one on each side of said mounting block, each of said side bracket means having a mounting bracket arm extending backward from said mounting block and adapted for mounting said capture block means therebetween such that said top wall portion of said mounting block is aligned with said forward portion of a top wall section of said capture block means to form a complete bottom wall portion of a linear card guide from said inlet/outlet slot to said entrance slit in said capture block means; each of said side bracket means having a vertical wall section extending above said mounting block and said capture block means to form side wall portions of a linear card guide leading to said entrance slit on said card guide means;

said drive shaft and pulley assembly being carried on said mounting block behind said frontplate, said pair of pulleys being spaced from each other by a distance greater than the separation between said drum wheels on said drum assembly and having a diameter greater than the diameter of said drum wheels thereby to allow said entrance card guide to be located between said pair of pulleys;

a motor assembly being mounted on an outer side surface of one of said side bracket means and being coupled in driving relation to said drive shaft and pulley assembly;

a pair of upper and lower drive belt guide wheels being mounted on said side bracket means immediately forward of the position of said entrance slit on said card guide means for directing each of said drive belts onto a respective one of said drum wheels carried on said drum assembly whereby a data card inserted through said inlet/outlet slot is accurately guided along said linear card guide path toward said entrance slit until respective edge portions of said data card are engaged between said drive belts and said drum wheels and thereafter driven through through said entrance slit into said cylindrical card guide path;

said capture block means comprises
a front capture block having a backward facing semicylindrical concave surface forming one half of said cylindrical internal cavity of said capture block means; and a back capture block having a frontward facing semicylindrical concave surface forming the other half of said cylindrical internal cavity of said capture block means;

said front capture block having said drum assembly mounted thereto, and said back capture block being mounted over said drum assembly and forming with said front capture block said card-in/out slit at an upper portion of said cylindrical card guide path;

said punch and die assembly including a solenoid operated plunger core means mounted within said mounting block and carrying said punch means; a punch guide bushing being mounted in a hub on a back portion of said solenoid and being received in a registration aperture formed in said forward facing surface of said front capture block and a compression punch return spring being carried in said punch guide bushing to bias said plunger core and punch to a retracted position; said die assembly being mounted in said drum assembly in an accurately registered position in the plane of said cooperative location pin and aperture arrangements which position said drum assembly relative to said front capture block to provide automatic alignment of a die aperture in said die assembly with said punch element.

24. Apparatus as claimed in claim 23, wherein said drive shaft on which said pair of pulleys is mounted extends through said said solenoid operated plunger of said punch means; said solenoid operated plunger comprises a bobbin having an aperture therethrough receiving said drive shaft with separate first and second winding supporting bobbin sections extending forward and rearward from said aperture and carrying first and second solenoid winding sections thereon; said plunger core means having a slot therein for receiving said drive shaft and accommodating driving movement of said plunger core relative to said drive shaft.

25. Apparatus as claimed in claim 23, adapted for reading a data card with a magnetic stripe thereon and wherein said transducer means is a magnetic read head mounted on said drum assembly at a prearranged position to detect data on said magnetic strip as said data card is driven around said cylindrical card guide path; and said punch and die means is mounted in a position aligned with said transducer means and is operable to punch a hole in said magnetic strip which can be sensed by said magnetic read head.

* * * * *